US008966580B2

(12) United States Patent
Sela et al.

(10) Patent No.: US 8,966,580 B2
(45) Date of Patent: Feb. 24, 2015

(54) SYSTEM AND METHOD FOR COPYING PROTECTED DATA FROM ONE SECURED STORAGE DEVICE TO ANOTHER VIA A THIRD PARTY

(75) Inventors: Rotem Sela, Haifa (IL); Aviad Zer, Kfar Vradim (IL)

(73) Assignee: SanDisk IL Ltd., Kfar Saba (IL)

( * ) Notice: Subject to any disclaimer, the term of this patent is extended or adjusted under 35 U.S.C. 154(b) by 886 days.

(21) Appl. No.: 12/113,338

(22) Filed: May 1, 2008

(65) Prior Publication Data
US 2009/0276829 A1    Nov. 5, 2009

(51) Int. Cl.
*G06F 7/04*      (2006.01)
*G06F 21/10*     (2013.01)
*G06F 21/60*     (2013.01)
*H04L 9/08*      (2006.01)
*H04L 9/32*      (2006.01)

(52) U.S. Cl.
CPC .............. *G06F 21/10* (2013.01); *G06F 21/606* (2013.01); *H04L 9/0838* (2013.01); *H04L 9/321* (2013.01); *H04L 9/3263* (2013.01); *H04L 9/3273* (2013.01); *G06F 2221/0791* (2013.01); *H04L 2209/603* (2013.01)
USPC ........ 726/2; 726/26; 726/27; 726/28; 726/29; 726/30; 726/31; 726/32; 726/33; 713/168; 713/150; 713/153; 713/171; 380/45; 380/201

(58) Field of Classification Search
USPC .......................... 380/201; 713/168; 726/26–33
See application file for complete search history.

(56) References Cited

U.S. PATENT DOCUMENTS

| 5,892,900 | A   | * | 4/1999  | Ginter et al. ................... 726/26 |
| 7,237,123 | B2  |   | 6/2007  | LeVine |
| 7,725,716 | B2  | * | 5/2010  | Tidwell et al. ................ 713/168 |
| 2006/0248352 | A1 |  | 11/2006 | Adams |
| 2007/0067403 | A1 | * | 3/2007 | Holmes ......................... 709/206 |
| 2007/0180232 | A1 | * | 8/2007 | Kasamatsu et al. ........... 713/159 |
| 2007/0248311 | A1 | * | 10/2007 | Wice et al. ..................... 386/52 |

OTHER PUBLICATIONS

Microsoft Computer Dictionary, Fifth Edition, Microsoft Press, May 2002, 3 pages.*
Heber Ltd., "Axis Security Overview," Axis Software User Manual, Jan. 12, 2008, 3 pages.*
B. Thompson and B. Fritchman, "USB Flash Memory Drives," Repairing and Upgrading Your PC, O'Reilly Media, 2006, 4 pages.*
MacDonald, et al., "Overcoming Channel Bandwidth Constraints in Secure SIM Applications," Information Security Group, Royal Holloway, University of London, Egham, Surrey TW20 0EX, UK; Smart Card Centre, Information Security Group, Royal Holloway, University of London, Egham, Surrey TW20 0EX, UK, 2005.
Kohiyama, et al., "Digital Content Protection LSI for PC-Based Digital TV Receivers," Fujitsu Sci. Tech. J., 42,2, p. 234-239 Apr. 2006, Oct. 3, 2005.
U.S. Appl. No. 12/113,335, filed May 1, 2008.

* cited by examiner

*Primary Examiner* — Mohammad A Siddiqi
(74) *Attorney, Agent, or Firm* — Brinks Gilson & Lione

(57) ABSTRACT

A third party is configured to establish a virtual secure channel between a source SSD and a destination SSD via which the third party reads protected digital data from the source SSD and writes the protected digital data into the destination SSD after determining that each party satisfies eligibility prerequisites. An SSD is configured to operate as a source SSD, from which protected data can be copied to a destination SSD, and also as a destination SSD, to which protected data of a source SSD can be copied.

40 Claims, 10 Drawing Sheets

SYSTEM AND METHOD FOR COPYING PROTECTED DATA FROM ONE SECURED STORAGE DEVICE TO ANOTHER VIA A THIRD PARTY

FIELD OF THE INVENTION

The present invention generally relates to storage devices and more specifically to a system and to a third party for copying protected and secured digital data, such as Digital Rights Management ("DRM") protected content (e.g., audio, movies, and games), from one secured storage device ("SSD") to another, and to an SSD that facilitates such data copy.

BACKGROUND

There are several types of protection mechanisms that prevent unauthorized duplication of digital content. Some protection mechanisms are often loosely referred to, and thought of, as a type of digital rights management ("DRM"). Considerable efforts have been made to stop duplication of digital content from one electronic device to another. For example, storage devices that are used with iPod devices include a protection mechanism that prohibits musical or audio-visual content from being transferred from one iPod device to another, in order to prevent unauthorized duplication of protected digital content.

Flash memory devices are an example SSDs. SIM ("Subscriber Identity Module") cards, megaSIM cards, and Universal Serial Bus ("USB") flash drives ("UFDs") are exemplary flash memory devices. SIM cards securely store service-subscriber key data that are used to identify a subscriber. SIM cards allow users to change phones by simply removing the SIM card from one phone and inserting it into another phone.

Currently, digital content that are stored in flash storage devices are protected by a security technology known as "Trusted Flash". "Trusted Flash" (TF) is a data storage technology that enables consumers to buy multimedia content such as music, movies, and games, on flash memory cards for use in mobile phones, laptop computers, PDAs and other compatible and supported devices. A storage device that utilizes a security technology such as the Trusted Flash is referred to herein as "secured storage device" (SSD). An SSD protects its sensitive and secured data by using an encryption engine or by placing (i.e., storing) the sensitive and secured data in a hidden or secured storage area within the SSD, and by using authentication scheme.

Music producers and movie studios, and other multimedia content originators and providers, are more willing to release multimedia content on trusted products (also referred to herein as "supported devices") because TF technology provides the security and DRM solutions that are required by them. A DRM solution involves enforcing a DRM policy on the electronic device (e.g., cell phone, iPod). A DRM policy is a set of restrictions imposed on the electronic device, which "tell" the electronic device what operations it can do with what digital content. For example, one policy rule may allow the electronic device to play a particular song only n times, for example 3 times, another policy rule may prohibit copying of digital content; another policy rule may allow replaying a digital data stream only by a specific electronic device, and so on. Consumers will be able to download protected digital content using online digital music services, for example, through their cell phone or personal computer ("PC").

Trusted Flash enables consumers to use their purchased multimedia content in supported devices. Trusted Flash technology empowers the memory card itself to be the manager of digital rights, thus giving consumers the freedom to transfer the storage device, and its content, to other supported devices without compromising its content protection system. Trusted Flash cards can function as regular memory cards in non-secure host devices.

Storage devices, including TF memory cards and TF storage devices in general, are present in the market with a diversity of storage capabilities (e.g., 512 megabytes to 8 gigabytes). Currently, if a TF card used by a user has no storage space left for new multimedia content, or it has poor performance or obsolete form factor, s/he would have to buy a new TF card in order to record new multimedia content. In order to enable DRM and security features, the memory space of TF cards is partitioned into several portions, as shown in FIG. 1, which is described below.

FIG. 1A shows an exemplary secured storage device (SSD) 100. SSD 100 includes mass storage area 108, which may be of a NAND flash variety. SSD 100 also includes secure storage controller 140 that manages mass storage area 108 via data and control lines 106 and communicates with host device 150 via host interface 102. Secure storage controller 140 controls all of the data storage and data retrieval to/from mass storage area 108 and data transfer to/from host device 150 by controlling, for example, "read", "write" and "erase" operations, wear leveling, and so on, and by controlling communication with host device 150.

User storage area 110 may also include protected data that can be used by a host device only if the host device gets also usage rules that indicate to the host device how to use the protected data. Failing to get these rules, the host device will not be able to use the protected data. Only a host device that authenticates itself to SSD 100 can get usage rules, as described below in connection with restricted storage area 120 and secure management storage area 130.

User Storage Area 110

Data stored in user storage area 110 is publicly available, which means that the data stored in user storage area 110 is unconditionally available to a user of SSD 100 and to any external entity (e.g., host device 150), regardless of its identity. That is, the digital data stored in user storage area 110 may include data that can be read by, or copied to, a host device (e.g., to host device 150) from SSD 100 and used (e.g., played back by host device 150) as is, without the host device having to authenticate itself to SSD 100. User storage area 110 may hold, for example, multimedia content, audio-visual content, etc.

User storage area 110 may also include protected data that can be used by a host device only if the host device gets also usage rules that indicate how to use the protected data. Failing to get these rules, the host device will not be able to use the protected data. Only a host device that authenticates itself to SSD 100 can get usage rules, as described below in connection with restricted storage area 120 and secure management storage area 130.

Restricted Storage Area 120

Restricted storage area 120 may hold restricted data (and optionally metadata and information) that represent, or are related, for example, to usage rights associated with digital data that is held in user storage area 110. Restricted data that are stored in restricted storage area 120 are accessible only to authorized devices. Data representing DRM rules are exemplary restricted data because they govern the usage of digital content and, as such, they are intended only for authorized devices.

"Protected data" refers to any data, file, application or routine, that is stored in an SSD but is accessible only internally (i.e., to the SSD's controller) or to external authorized devices. Such data, file, application or routine can either be restricted from being transferred to an external device such as host device 150, or it can be transferred or copied to another device and be useless without the device using proper means (e.g., decryption keys) to access or use it.

Security Management Storage Area 130

In general a security management storage area may contain authentication keys of devices that are entitled to access the restricted storage area of a storage device. Turning again to FIG. 1, data stored in security management storage area 130 (referred to herein after as "security data") is available only to secure storage controller 140 for internal processes (e.g., authentication) but not to host device 150 or to the host device's user. The security data held in security management storage area 130 may include, for example, the system's firmware, any data type of operating parameter (e.g., encryption and decryption keys, digital authentication certificates attesting to the identity, capabilities and privileges of SSD 100 and external devices), and other data that is desirable to have safeguarded from unfettered access, which would be the case if they were stored in user storage area 110. Authentication certificates of devices (e.g., media players and cell phones) specify to the secure storage controller 140 the devices that are entitled to use data that is held in the restricted storage area 120, and encryption/decryption keys that are stored in security management storage area 130 can be utilized by secure storage controller 140 to encrypt and decrypt data that is stored in SSD 100. The security data held in security management storage area 130 typically is related to security applications or to security routines.

A security application is traditionally intended to function only on the SSD upon which it was loaded. For example, a security application may generate one time passwords using a serial number or other data of the secured storage, and then submit them for login or verification of a user or user's account. This is only an example, and any number of algorithms used in security or other functions may be based, at least in part, upon storage device specific data. Security applications may be loaded over time by a user.

The security of digital data may be provided by the SSD 100 system's firmware and/or hardware, by encryption/decryption keys, and/or by security applications. In some cases, copy-protected content is encrypted and although the encrypted content may be copied from restricted storage area 120 to another device or application, it cannot be decrypted by the other device or application unless the other device or application is authenticated by SSD 100 and has the proper key(s) to decrypt the encrypted content.

Secure storage controller 140 utilizes security routines and security-related data (e.g., encryption keys) to impart security capabilities to SSD 100, which means, for example, that SSD 100 prohibits illegal use of the protected digital content stored in SSD 100 and generation of illegal copies thereof. To accomplish this, secure storage controller 140 controls the access to content held in restricted storage area 120 based on security data (e.g., keys, authentication certificates, security routines, etc.) that are held in security management storage area 130. Authentication may be executed by using the Private Key Infrastructure ("PKI"), symmetric keys, password-based schemes, or any other authentication scheme.

"PKI" is a well known security paradigm. In cryptography, PKI is an arrangement that binds public keys with respective user identities by means of a certificate authority (CA). The user identity must be unique for each CA. The binding is established through the registration and issuance process, which, depending on the level of assurance the binding has, may be carried out by software at a CA, or under human supervision. For each user, the user identity, the public key, their binding, validity conditions and other attributes cannot be forged if they are in public key certificates issued by the CA.

PKI arrangements enable computer users without prior contact to be authenticated to each other and to use the public key information in their public key certificates to encrypt messages to each other. In general, a PKI consists of client software, server software, hardware (e.g., smart cards), legal contracts and assurances, and operational procedures. A signer's public key certificate may also be used by a third-party to verify the digital signature of a message, which was made using the signer's private key. In general, a PKI enables the parties in a dialogue to establish confidentiality, message integrity and user authentication without having to exchange any secret information in advance, or even any prior contact. In cryptography, a public key certificate (or identity certificate) is an electronic document which incorporates a digital signature to bind together a public key with identity information. The certificate can be used to verify that a public key belongs to an individual. In a typical PKI scheme the signature will be of a certificate authority (CA).

Turning again to FIG. 1, host device 150 cannot directly access mass storage area 108. That is, if host device 150 asks for or needs data from SSD 100 host device 150 has to request it from secure storage controller 140, regardless of whether the requested data is held in user storage area 110, in restricted storage area 120, or in security management storage area 130. If the data requested by host device 150 is stored in restricted storage area 120, secure storage controller 140 checks whether host device 150 is authorized to get that data by utilizing security data that is stored in security management storage area 130.

In order for host device 150 (an exemplary device) to use, for example, media content that is held in user storage area 110, host device 150 communicates with secure storage controller 140, and secure storage controller 140 utilizes data that is stored in security management storage area 130 to check whether the host device 150 is entitled to use the media content that is held in user storage area 110. If host device 150 is entitled to use the media content that is held in user storage area 110, secure storage controller 140 allows host device 150 to use that data based on usage rules, or restrictions, that are held in restricted storage area 120.

If SSD 100 is used with a supported device, which may be, for example, an MP3 player, the data stored in restricted storage area 120 is usable by the supported device but is inaccessible to the user of the device. The reason for this restriction is that the restricted storage area 120 contains sensitive data or information that specify to external devices the rules (DRM or others) governing the usage of the multimedia content, and the restricted storage area 120 is made inaccessible to the SSD 100 user in order not to allow the user to manipulate or violate the DRM rights or usage rules.

Copying an individual multimedia content from one secured storage to another requires that the DRM rights, authentication particulars (i.e., digital authentication certificates, keys, etc.), and other information associated with the individual multimedia content, be copied as well. However, as explained above, being stored in restricted storage area 120 of the SSD 100, this information (i.e., DRM rights, authentication particulars, etc.) is inaccessible to the user, for which reason even though the user may be able, in some cases, to copy the multimedia content in question to another SSD, the other SSD will not be able to use (e.g., play back) the copied multimedia content.

As another example, security applications relating to medical or financial records can be loaded into SSD 100. These applications may be executed by secure storage controller 140 alone or in combination with a processor (not shown in FIG. 1) of host device 150, and these applications may not only handle confidential information, but also the secret information used in encrypting and safeguarding the sensitive contents of the secured storage. As such, SSD 100 and host device 150 may be functionally deeply interconnected and reliant upon the security mechanisms and information within the SSD 100. In some cases, the security mechanisms of the applications themselves utilize secured storage specific information and will not function on another secured storage. The applications themselves may also be encrypted and device-specific in order to prevent them from being misused (e.g., copied and hacked).

In essence, security mechanisms aim to make it impossible to copy protected data from one SSD to another. This has the unfortunate result in some secured storage devices that even an authorized owner or licensee of the protected data cannot move it from one of his/her filled up secured storages to another. Therefore, if the user wants to record new multimedia content and still keep his/her already recorded multimedia content, s/he would have to keep two secured storage devices: the "old" SSD, which contains previously recorded multimedia content, and the new SSD, for recording new multimedia content.

It would, therefore, be beneficial to have a method and system that would allow a source SSD and a destination SSD to trust a third party enough to allow the third party to transfer multimedia content and the associated protected data from the source SSD to the destination secured storage in such a way that the transferred (i.e., copied) multimedia content would be usable by the destination SSD in the same way as it was usable by the source SSD.

SUMMARY

The following embodiments and aspects thereof are described and illustrated in conjunction with systems, tools, and methods, which are meant to be exemplary and illustrative but not limiting in scope.

According to the present disclosure a third party is configured to establish a virtual secure channel between a source SSD and a destination SSD via which the third party reads protected, or secured, digital data from the source SSD and writes the protected, or secured, digital data into the destination SSD after determining that each party (i.e., the third party, source SSD and destination SSD) satisfies eligibility prerequisites. The source SSD, the destination SSD, or both SSDs, may be, for example, a removable memory card or an embedded memory card.

A method for copying digital data from a source SSD to a destination secured device via a third party is provided, the method including determining by the source SSD whether the third party is eligible to receive therefrom digital data, the digital data including protected data that are stored in the source SSD and cannot be copied to ineligible devices; and determining by the third party whether a destination SSD is eligible to receive the digital data. If each of the third party and the destination SSD is eligible to receive the digital data, a virtual secure channel is established, via the third party, between the source SSD and the destination SSD, and the third party copies the digital data from the source SSD to the destination SSD via the third party and over the virtual secure channel. Copying the digital data to the destination SSD includes a step of setting, by the third party, the configuration of the destination SSD to be the same as the configuration of the source SSD before the digital data is copied to the destination SSD.

The third party causes access to the protected data stored in the source SSD to be blocked in order to prevent future use of the protected data stored in the source SSD. In an example embodiment the access to the protected data is blocked by manipulating data that is stored in the source SSD, either by the third party or by the source SSD. In another example embodiment the access to the protected data is blocked responsive to a block command that the third party sends to a controller of the source SSD to block access to the protected data stored therein. Manipulating data that is stored in the source SSD may also refer to, or mean, encrypting the data.

In an example embodiment of the present disclosure establishing the virtual secure channel includes establishing a first secure channel between the source SSD and the third party, and establishing a second secure channel between the third party and the destination SSD. Establishing the first secure channel may include using a first session key that is available to the source SSD to encrypt the digital data and to the third party to decrypt the encrypted digital data, and establishing the second secure channel may include using a second session key that is available to the third party to encrypt the digital data and to the destination SSD to decrypt the encrypted digital data. The first session key and the second session key may be generated randomly by the third party and by the respective SSD.

In another example embodiment of the present disclosure establishing the virtual secure channel between the source SSD and the destination SSD includes using a predetermined content key that is available to the source SSD to encrypt the digital data and to the destination SSD to decrypt the encrypted digital data. The content key may made available to the source SSD and to the destination SSD during their manufacturing.

The step of determining by the third party whether the destination SSD is eligible to receive the digital data may include the step of proving to the destination SSD that the third party is eligible to send the digital data to the destination SSD before the destination SSD receives the digital data.

A system is provided for copying digital data from one SSD to another via a third party, the system including a host device system, the host device system being adapted to host a source SSD and a destination SSD, the source SSD containing digital data that includes protected data that are not transferable to ineligible devices; and a third party that is operatively connectable to the host device system, wherein the third party is configured (i) to prove to the source SSD of its eligibility to receive therefrom the digital data and, after proving its eligibility to receive from source SSD the digital data, and upon proving to the third party that the source SSD is eligible to transfer the digital data to a destination SSD (ii) to establish a first secure channel with the source SSD, the first secure channel being part of a virtual secure channel that is to be established by the third party between the source SSD and the destination SSD and (iii) to receive the digital data from the source SSD over the first secure channel.

The host device system may include a user interface, for example, a keypad or a touchscreen, to receive a user instruction, and the third party may be configured to commence a data copy process responsive to the user instruction. By "data copy process" is meant herein establishing communication between the third party and the source SSD and destination SSD, reading data from the source SSD and writing the data read from the source SSD into the destination SSD, all these operations are initiated by the third party, responsive to a user instruction or automatically, such as upon connecting the source SSD and the destination SSD to the host device system.

The third party may be further configured (iv) to complete the virtual secure channel by establishing a second secure channel with the destination SSD and (v) to transfer the digital data received from the source SSD to the destination SSD over the second secure channel, upon proving to the third party that the destination SSD is eligible to receive the digital data from the source SSD.

The third party may cause the source SSD to manipulate data stored therein in order to prevent future use of the protected data held in the source SSD, and therefore to prevent future use of the source SSD. Alternatively, the source SSD may manipulate data stored therein autonomously, for example after a predefined time elapses from the time the third party reads the digital data from the source SSD.

In an example embodiment the host device system includes one host device for hosting the source SSD and the destination SSD, one storage device at a time. In another example embodiment the host device system includes one host device for hosting the source SSD and the destination SSD simultaneously. In yet another example embodiment the host device system includes a first host device for hosting the source SSD, and a second host device for hosting the destination SSD.

Either one of the source SSD and the destination SSD may be a flash memory that may be selected from the group consisting of Trusted Flash device, Secure Digital ("SD"), miniSD, microSD, Hard Drive ("HD"), Memory Stick ("MS"), USB device, Disk-on-Key ("DoK"), and iNAND.

A third party is provided for copying digital data from a source SSD to a destination SSD that are hosted by a host device system, the source SSD containing digital data that includes protected data that are not transferable to ineligible devices, the third party including: (a) an authentication manager, the authentication manager being configured (i) to log-in into the source SSD and into the destination SSD (ii) to check eligibility prerequisites prior to copying the digital data from the source SSD to the destination SSD and, upon satisfying the prerequisite conditions (iii) to establish a virtual secure channel between the source SSD and the destination SSD, and to copy the digital data from the source SSD to the destination SSD over the virtual secure channel and (iv) to receive from the host device system a user instruction to commence the data copy process of the digital data from the source SSD to the destination SSD; and (b) a storage device configurator to configure the destination SSD such that the destination SSD has the same configuration as the configuration of the source SSD.

A source SSD is provided, which facilitates reading protected data therefrom in order to copy the protected data to a destination SSD via a third party, the source SSD including a mass storage area that stores, or may store, digital data, the digital data including protected data that are not transferable to ineligible devices; and a secure storage controller. The source SSD's secure storage controller is adapted (i) to determine whether a third party is eligible to receive therefrom the digital data and to transfer the digital data to a destination SSD and, if so (i.e., if both conditions are satisfied), (ii) to establish a secure channel between the source SSD and the third party and (iii) to transfer the digital data to the third party over the secure channel.

The secure storage controller may be further adapted to prove to the third party its eligibility to send the digital data to the third party, generate a content key to encrypt the digital data and to transfer the encrypted digital data to the third party.

The secure storage controller may establish the secure channel by using a session key that is available to the secure storage controller to encrypt the encrypted digital data and to the third party to decrypt the encrypted digital data, and the secure storage controller may generate the session key randomly by using data originating from the destination SSD. Responsive to the secure storage controller receiving a command from the third party to prevent future use of the protected data the secure storage controller may manipulate data stored in the mass storage area such that the protected data can no longer be used.

A destination SSD is also provided to facilitate copy of protected data thereto from a source SSD via a third party, the destination SSD including a mass storage area for storing therein digital data that originates from a source SSD, the digital data including protected data that are not transferable to ineligible devices; and a secure storage controller. The secure storage controller may be adapted (i) to prove to a third party its eligibility to receive the digital data from the third party and, upon proving the eligibility of the secure storage controller, (ii) to establish a secure channel between the destination SSD and the third party and to receive the digital data from the third party over the secure channel. The secure storage controller may be further adapted to determine whether the third party is eligible to write the digital data into the destination SSD's mass storage area.

If the digital data received by the destination SSD is encrypted by the source SSD by using a content key, the secure storage controller may be further adapted to receive the content key via the third party and to use the content key to decrypt the encrypted digital data.

The secure storage controller may establish the secure channel by using a session key that is available to the third party to encrypt the digital data and to the secure storage controller to decrypt the encrypted digital data. The secure storage controller may generate the session key randomly by using data originating from the source SSD. The source SSD and the destination SSD may be the same SSD.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments disclosed herein are illustrative rather than restrictive. The disclosure, however, may better be understood with reference to the following detailed description when read with the accompanying figures, in which.

Figure 1:
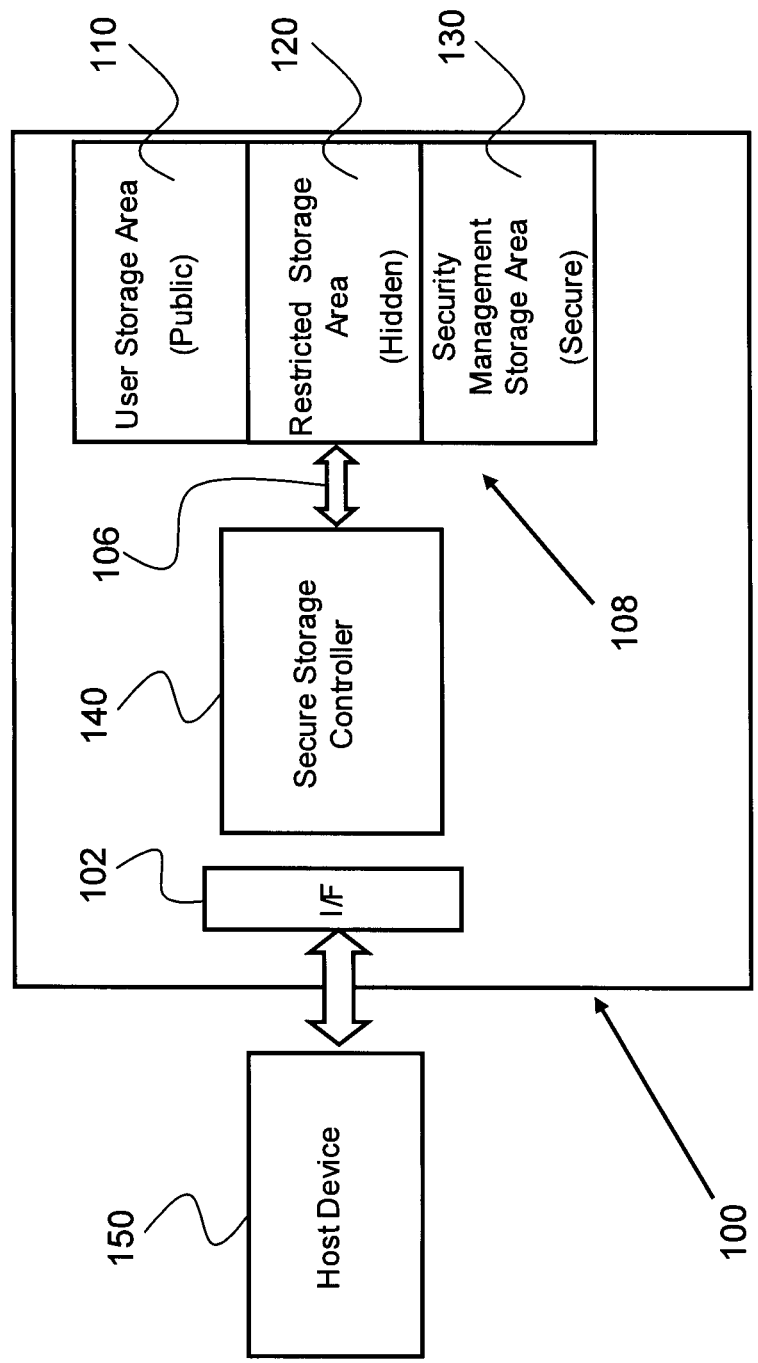
FIG. 1 is a block diagram of a typical secured storage device (SSD)

It will be appreciated that for simplicity and clarity of illustration, elements shown in the figures are not necessarily drawn to scale. Further, where considered appropriate, reference numerals may be repeated among the figures to indicate like, corresponding or analogous elements.

DETAILED DESCRIPTION

The claims below will be better understood by referring to the present detailed description of example embodiments of the invention. This description is not intended to limit the scope of claims but instead to provide examples of the invention.

According to the present disclosure secured multimedia content (also referred to herein as "protected digital content" and "protected data") of a source SSD can be copied from a source SSD to a destination SSD via a third party. The third party is provided with authentication means, which may be authentication certificate and authentication keys, to identify itself to the source SSD and to the destination SSD, and for proving, the source SSD, its eligibility to receive therefrom protected data that is part of digital data that is stored in the source SSD. The third party is also provided with authentication certificates and authentication keys that allow the third party to identify SSDs, and, in addition, to know whether a source SSD is eligible to transfer protected data to a destination SSD and whether the destination SSD is eligible to receive the protected data of, or originating, from the source SSD.

The third party, which may be a trusted computer system or a trusted application, may be local or remote (at least from one SSD's point of view) and it may independently serve multiple local or remote SSDs. "Third party" refers to any computer system that transfers digital content from a source SSD to a destination SSD under stringent rules in order to protect confidentiality of the protected data and to impart to the destination SSD the security level originally enforced by the source SSD on its digital data.

Figure 2:
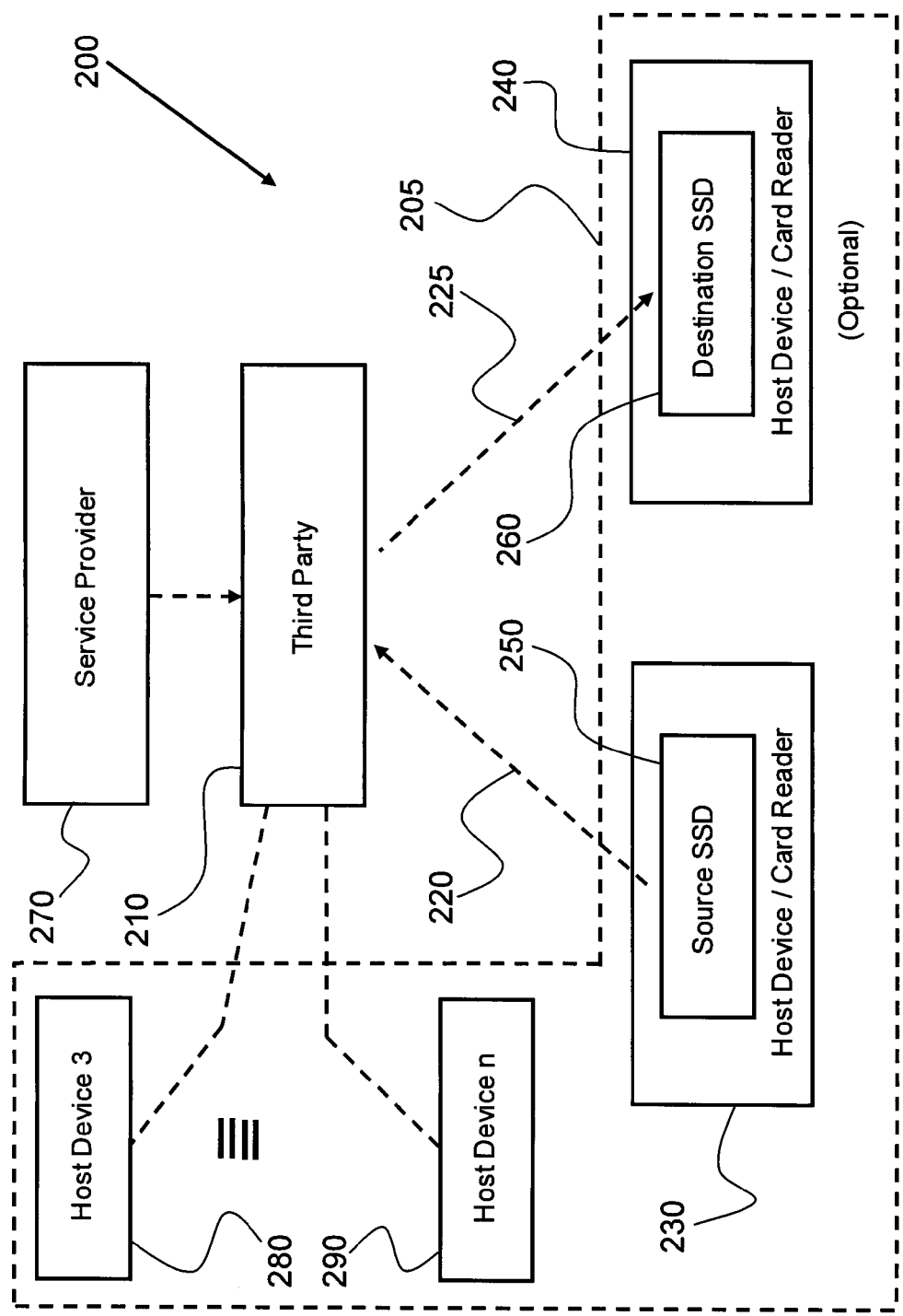
FIG. 2 schematically illustrates a system for copying protected data from one SSD to another via a third party in accordance with the present disclosure.

FIG. 2 schematically illustrates a system 200 for copying protected data from a source SSD 250 to a destination SSD 260 via a third party 210 in accordance with the present disclosure. In general, system 200 includes a host device system 205 for hosting, or accommodating, source SSD 250 and destination SSD 260, and a third party 210 that is operatively connected to host device system 205, the operative connections being shown in FIG. 2 as dashed lines 220 and 225. Source SSD 250 contains digital data that includes protected data that are not transferable to, accessible by, and usable by ineligible devices. That is, a digital content that is downloaded to an SSD through a media player (such as MP3 or cell phone) from a multimedia content provider is usually intended only for the specific media player it was loaded to, and any other SSD is regarded as an ineligible device, for it cannot receive protected data from any other SSD, nor can it access such data in another SSD or use it in any way.

Binding the digital content to the specific media player is done by the SSD binding usage rules (e.g., DRM policy rules) to the digital content and enforcing these rules. In order to prevent use of the digital content by any other device, the secure storage controller of the SSD does not allow any other device to access the usage rules and the security features that are stored in its restricted storage area and in its secured management storage area. "Usage rules" and "security features" are exemplary protected data. However, a corresponding certificate may be issued by a trusted certificate authority ("CA") and provided to SSDs, which will "tell" the SSDs that there is an entity (i.e., the third party) that has permission or mandate to copy therefrom protected data.

Third party 210 may be owned by a service provider such as service provider 270. If third party 210 is owned by service provider 270, users will need a service agreement with service provider 270 that allows them to copy the entire digital data (including protected data) from one SSD (e.g., source SSD 250) to another SSD (e.g., destination SSD 260) via third party 210. Service provider 270 will need to have an agreement with the entity that places the authentication certificates in the SSDs, usually with the SSDs' manufacturer.

In some cases, though, some SSDs may not be entitled to the data copy service rendered by the third party. Therefore, before any data copy occurs, the source SSD must prove to third party 210 of its eligibility to be serviced; i.e., that its digital data can be copied to another (i.e., destination) SSD. In return, third party 210 proves to source SSD 250 of its eligibility to receive therefrom the entire digital data (including the protected data).

After third party 210 proves to source SSD 250 of its eligibility to receive therefrom the digital data, and upon proving to third party 210 that source SSD 250 is eligible to transfer the digital data to destination SSD 260, third party 210 establishes a first secure channel 220 with source SSD 250, which is part of a virtual secure channel that is yet to be established, through third party 210, between source SSD 250 and destination SSD 260. By "secure channel" is meant a communication channel over which ciphered data is communicated. By "virtual secure channel" is meant a secure channel whose establishment is proactively commenced by and via a third party between a source SSD and a destination SSD, in a way that digital data are copied or transferred from a source SSD to a destination SSD without the source SSD and the destination SSD communicating with each other directly. The secure channel is "virtual" also because it includes two separate and independent secure channels (e.g., secure channels 220 and 225) that can be established by the third party at the same time, concurrently, or at different times.

After first secure channel 220 is established by third party 210 and source SSD 250, third party 210 receives, or reads, the digital data from source SSD 250 over first secure channel 220, and establishes second secure channel 225 with destination SSD 260 to complete the virtual secure channel between source SSD 250 and destination SSD 260. Third party 210 may receive from a user of data copy system 200 an instruction to establish second secure channel 225 with destination SSD 260 whenever desired by the user, for example, immediately after third party 210 receives the digital data from source SSD 250, a few seconds later, 3 months later, and so on.

A destination SSD must prove to the third party its eligibility to receive digital data originating from an SSD. Upon proving to third party 210 that destination SSD 260 is eligible to receive the digital data originating from source SSD 250, third party 210 transfers, copies, or writes, the digital data it received from source SSD 250 to destination SSD 260 over the second part of the virtual secure channel (i.e., second secure channel 225).

As part of the trust the source SSD has in third party 210, no two legitimate copies of the digital can exist (i.e., one in the source SSD and the other in the destination SSD). To achieve that, third party 210 disables source SSD 250. By "disabling a source SSD" is meant herein causing, by the third party, protected data in the source SSD to be unusable or inaccessible to any device, including the SSD that originally holds the protected data. Disabling a source SSD is performed by causing the source SSD to manipulate data stored therein in order to prevent future use of the source SSD's protected data.

Third party 210 may cause source SSD 250 to manipulate the data stored therein by communicating to it a corresponding instruction or command. Third party 210 may cause source SSD 250 to manipulate the data stored therein at any time after third party 210 receives the digital data from source SSD 250. In one example third party 210 causes source SSD 250 to manipulate the data stored therein upon completion of transfer of the digital data from source SSD 250 to third party 210 and before third party 210 transfers the digital data to destination SSD 260. In another example third party 210 causes source SSD 250 to manipulate the data stored therein upon completion of transfer of the digital data to destination SSD 260. Third party 210 may cause source SSD 250 to manipulate the data stored therein between the two extreme instances described above.

In one example, manipulation by third party 210 of data that is stored in source SSD 250 includes disabling, erasing, or modifying security features in source SSD 250 which are associated with the protected data. The type, amount, or location (i.e., in the SSD's storage area) of the data to be manipulated will be chosen such that after its manipulation the protected data of source SSD 250 will become inaccessible to any electronic device. In another example, manipulation, by third party 210, of data that is stored in the source SSD 250 includes disabling, erasing, or modifying authentication parameters held in source SSD 250, which are associated with the protected data, such that no device can use the protected data. Third party 210 may alternatively cause the access to the protected data to be blocked by sending a corresponding (block) command to source SSD 250 to block the access to the protected data to any device. Third party 210 may be a computer system that is trusted by source SSD 250 and by destination SSD 260. Third party 210 may be an application that runs on a computer system and is trusted by source SSD 250 and by destination SSD 260.

Host device system 205 includes two separate host devices 230 and 240. Each of host devices 230 and 240 may have a card reader to accommodate an SSD, or a secure USB device that can read SSDs. Each of the card readers may accommodate a source SSD or a destination SSD. By way of example the card reader of, or associated with, host device 230 accommodates source SSD 250, and the card reader of, or associated with, host device 240 accommodates destination SSD 260.

Any conventional card reader can be used to read content/data from an SSD, provided that the card reader suits the type of SSD.

A host device system may include one host device (e.g., host device 230, host device 240 being optional) that may include, or have associated with it, one card reader for accommodating the source SSD and the destination SSD (not at the same time), or two card readers, one for each SSD. Alternatively, a host device system may include two host devices (e.g., host devices 230 and 240), where each host device has its own card reader. If the host device includes one card reader, copying the digital data of a source SSD to a destination SSD (by using the data copy service rendered by the third party) involves, among other things, using the card reader a first time to read and transfer the digital data, over the first secure channel, from the source SSD to the third party and, after replacing the source SSD with the destination SSD, a second time to write, transfer, or copy the digital data from the third party to the destination SSD over the second secure channel. A card reader associated with a host device may be an integral part of the host device, or external to the host device and operatively connected to the host device.

Each of source SSD 250 and destination SSD 260 may be identical or similar to SSD 100 of FIG. 1. Source SSD 250 may contain a digital data that may include user accessible multimedia content and protected data, which may include copy-protected data, secrete data, secrete metadata, security applications, DRM files, and the like, which the SSD's user may decide to copy from source SSD 250 to destination SSD 260. Copying protected data to destination SSD 260 will impart to destination SSD 260 the same security level associated with, or originally enforced by the source SSD 250 on the digital content.

Host device system 205 may include additional multiple host devices, designated as "host device 3" (shown at 280) through "host device n" (shown at 290), to which third party 210 may be operatively connected. A host device may be located locally or remotely with respect to the third party 210. The communication between third party 210 and any of the host devices of host devices system 205 may be performed via any combination of a dedicated communication cable, a landline, a data network, the Internet, and wirelessly.

Figure 3:
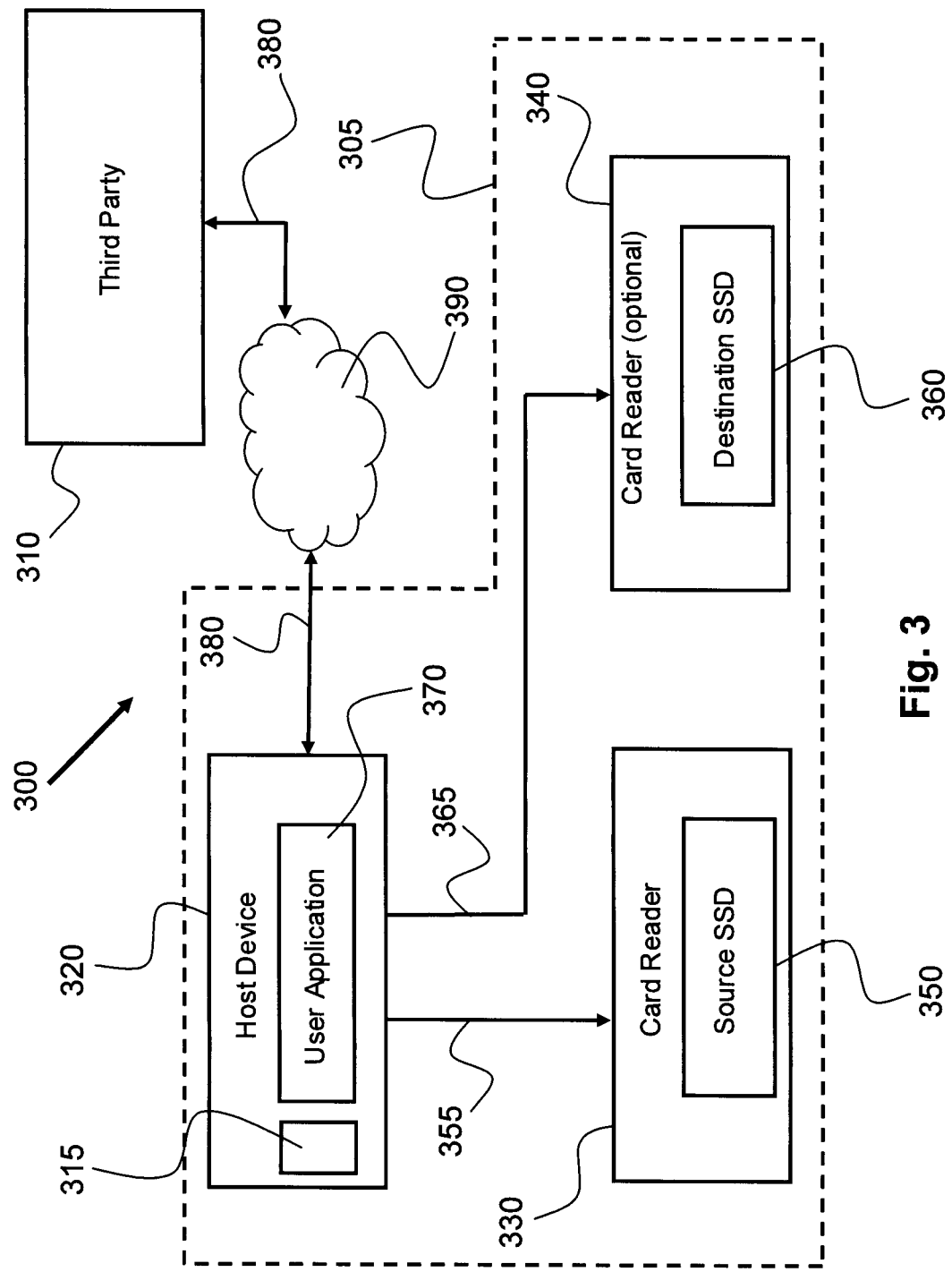
FIG. 3 schematically illustrates a system for copying protected data from one SSD to another, via a third party, according to an example embodiment of the present disclosure.

FIG. 3 schematically illustrates a system 300 for copying digital data, including protected data, from a source SSD 350 to a destination SSD 360, via a third party 310, according to an example embodiment of the present disclosure. Third party 310 is operatively connected, via data network (e.g., the Internet) 390, to host device system 305. Host device system 305 includes one host device (shown at 320) that has associated with it two card readers: card reader 330 and card reader 340. Card reader 330 and card reader 340 are external to host device 320. By way of example card reader 330 accommodates source SSD 350, and card reader 340 accommodates destination SSD 360.

After satisfying eligibility prerequisites that are specified above, third party 310 establishes a virtual secure channel between source SSD 350 and destination SSD 360, by establishing a first secure channel with source SSD 350 and a second secure channel with destination SSD 360. The first secure channel is established over communication lines 355 and 380, and the second secure channel is established over communication lines 365 and 380.

Host device 320 includes a client application 370 and a user interface 315. User interface 315 may be, for example, a keypad or a touchscreen. User interface 315 enables a user to interact with client application 370. For example, the user may use user interface 315 to enter a user instruction that indicates to client application 370 that source SSD 350 and destination SSD 360 are in place (i.e., source SSD resides in card reader 330 and destination SSD resides in card reader 340), waiting to be serviced by third party 310, and that the digital data of the source SSD can be copied to the destination SSD, and they will be read from source SSD 350, or copied to the destination SSD 360, if the eligibility prerequisites are satisfied. Responsive to such indication, client application 370 sends to third party 310, via communication link 380 and over data network 390, a message to third party 310 that instructs third party 310 to commence a data copy session with the SSD in question; i.e., first with source SSD 350 and then with destination SSD 360.

To commence the data copy session third party 310 logs on, over the first secure channel and via host device 320, into source SSD 350, for example by using a system Access Control Record ("ACR") of source SSD 350. If third party 310 and source SSD 350 authenticate each other and third party 310 proves to source SSD 350 it eligibility to receive therefrom digital data, source SSD 350 allows third party 310 to read whatever data source SSD 350 holds in its mass storage area, including protected data, and, in general, each data that is requested by third party 310.

After third party 310 reads the digital data from source SSD 350 third party 310 logs on, over the second secure channel and via host device 320, into destination SSD 360 system, for example by using a system ACR of destination SSD 360. If third party 310 and destination SSD 360 authenticate each other and destination SSD 360 proves to third party 310 its eligibility to receive the digital data, trusted third party 310 writes the data it read from source SSD 350 into destination SSD 360, to thereby complete the copy process.

Figure 4:
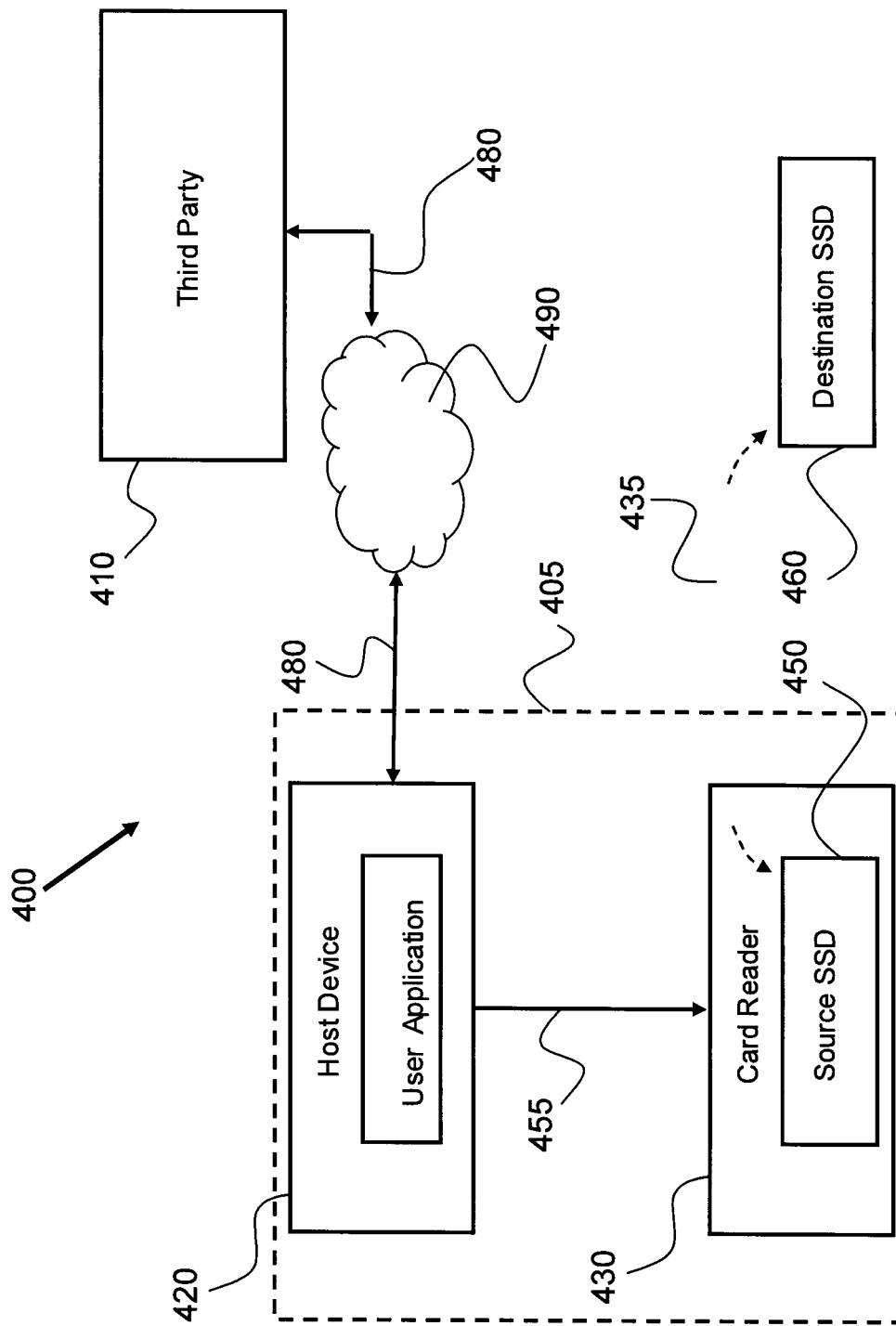
FIG. 4 schematically illustrates a system for copying protected data from one SSD to another, via a third party, according to another example embodiment of the present disclosure.

FIG. 4 schematically illustrates a system 400 for copying digital data, including protected data, from a source SSD 450 to a destination SSD 460, via a third party 410, according to another example embodiment of the present disclosure. Third party 410 is operatively connected, via data network (e.g., the Internet) 490, to host device system 405. Host device system 405 includes one host device (shown at 420) that has associated with it one card reader: card reader 430. Card reader 430 is external to host device 420. By way of example card reader 430 is shown accommodating source SSD 450, but it can accommodate destination SSD 460 as well.

After satisfying the specified eligibility prerequisites, third party 410 establishes a virtual secure channel between source SSD 450 and destination SSD 460. In order to establish the virtual secure channel between source SSD 450 and destination SSD 460 third party 410 establishes a first secure channel with source SSD 450, over which third party 410 reads digital data from source SSD 450, and, after replacing source SSD 450 with destination SSD 460 (the replacement symbolically shown by dashed line 435), a second secure channel with destination SSD 460. The first secure channel and the second secure channel can be established over the same communication lines 455 and 480 because third party 410 deals with the two SSDs one SSD at a time.

Figure 5:
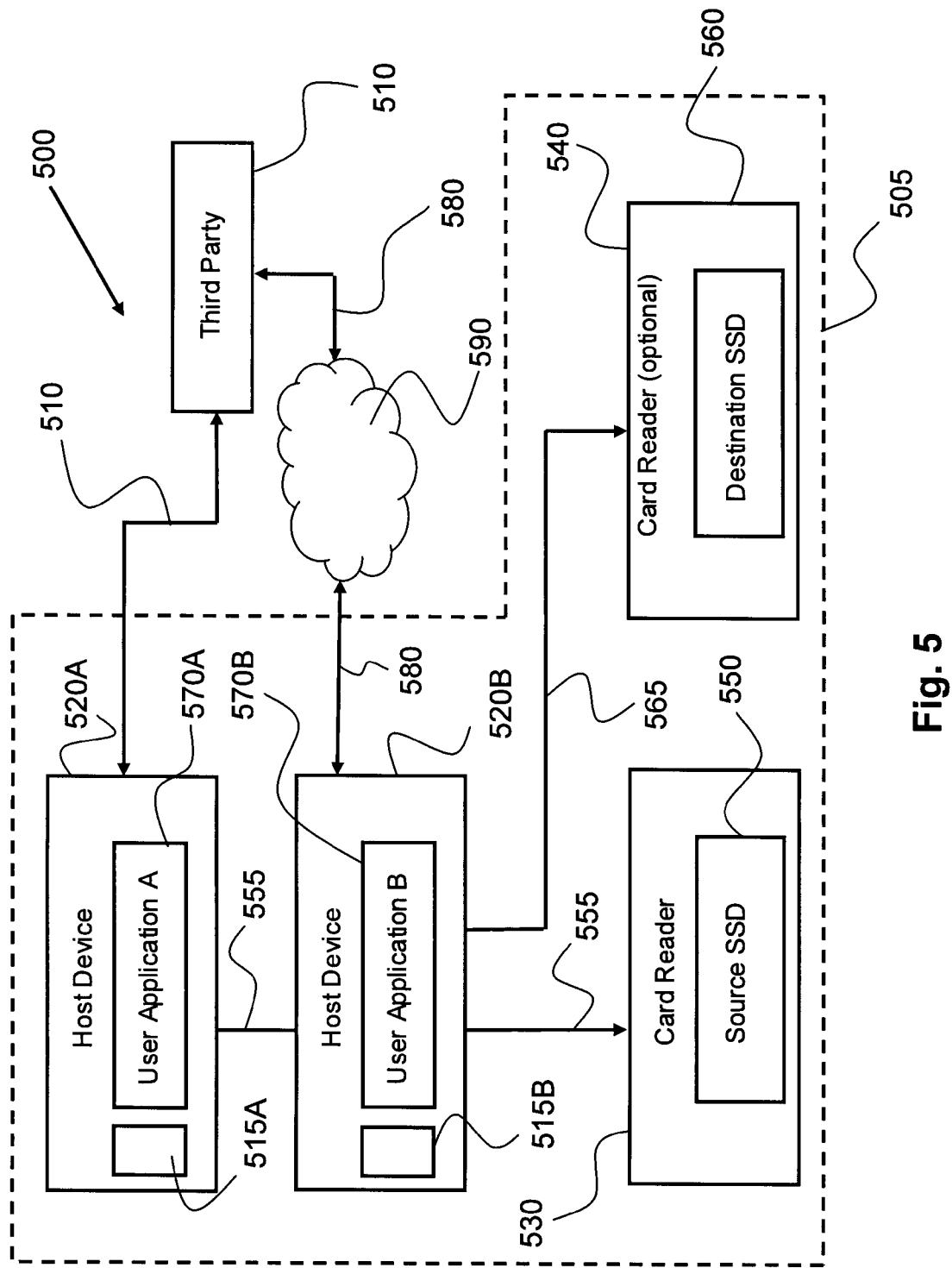
FIG. 5 schematically illustrates a system for copying protected data from one SSD to another, via a third party, according to yet another example embodiment of the present disclosure

FIG. 5 schematically illustrates a system 500 for copying protected data from source SSD 550 to destination SSD 560, via a third party 510, according to yet another example embodiment of the present disclosure. Third party 510 is operatively connected, via data network (e.g., the Internet) 590, to host device system 505. Host device system 505 includes two host devices, host device 520A and host device 520B, each host device having associated with it one card reader and a user application. Card reader 530 and user application 570A are associated with host device 520A. Card reader 540 and user application 570B are associated with host device 520B. Card reader 530 and card reader 540 are external to the respective host device. However, as explained above, a card reader may be an integral part of or embedded in a host device. By way of example card reader 530 accommodates source SSD 550 and card reader 540 accommodates source SSD 560.

Host devices 520A and 520B may be operatively connected to third party 510 by using the same type of communication path, or different types of communication paths. By way of example host device 520A is operatively connected to third party 510 via a land line 510, and host device 520B is operatively connected to third party 510 via a communication path 580 and a data network 590. The configuration of FIG. 5 is useful, for example, in cases where a user wants to copy the digital data of her/his SSD to a remote SSD that belongs, for example, to a friend of his. The user's host device (e.g., host device 520A) may be located in one city and the friend's host device (e.g., host device 520B) may be located in another.

Each of user applications 570A and 570B may include two separate and independent procedures: a "reading procedure" and a "writing procedure". The reading procedure allows a user to instruct a third party to read digital data from a source SSD, and the writing procedure allows the same user, or another user, to instruct the third party to write the read digital data to a destination SSD. The user may select, activate, or otherwise cause or trigger the execution of the proper procedure (i.e., reading procedure or writing procedure) according to the role of the SSD (i.e., source SSDA or destination SSD). Referring again to FIG. 5 a first user may select, activate, or otherwise cause or trigger (e.g., by using user interface 515A) the execution of the reading procedure to cause third party 510 to read digital data from source SSD 550. A second user may select, activate, or otherwise cause or trigger (e.g., by using user interface 515B) the execution of the writing procedure to cause third party 510 to write the read digital data to destination SSD 560.

If the eligibility prerequisites specified herein are satisfied, third party 510 establishes a virtual secure channel between source SSD 550 and destination SSD 560. In order to establish the virtual secure channel between source SSD 550 and destination SSD 560 third party 510 establishes a first secure channel (via communication paths 510 and 555) with source SSD 550, via which third party 510 reads the digital data from source SSD 550, and a second secure channel (via communication path 580, data network 590, and communication path 565) with destination SSD 560, via which third party 510 writes the read digital data into destination SSD 560.

Figure 6:
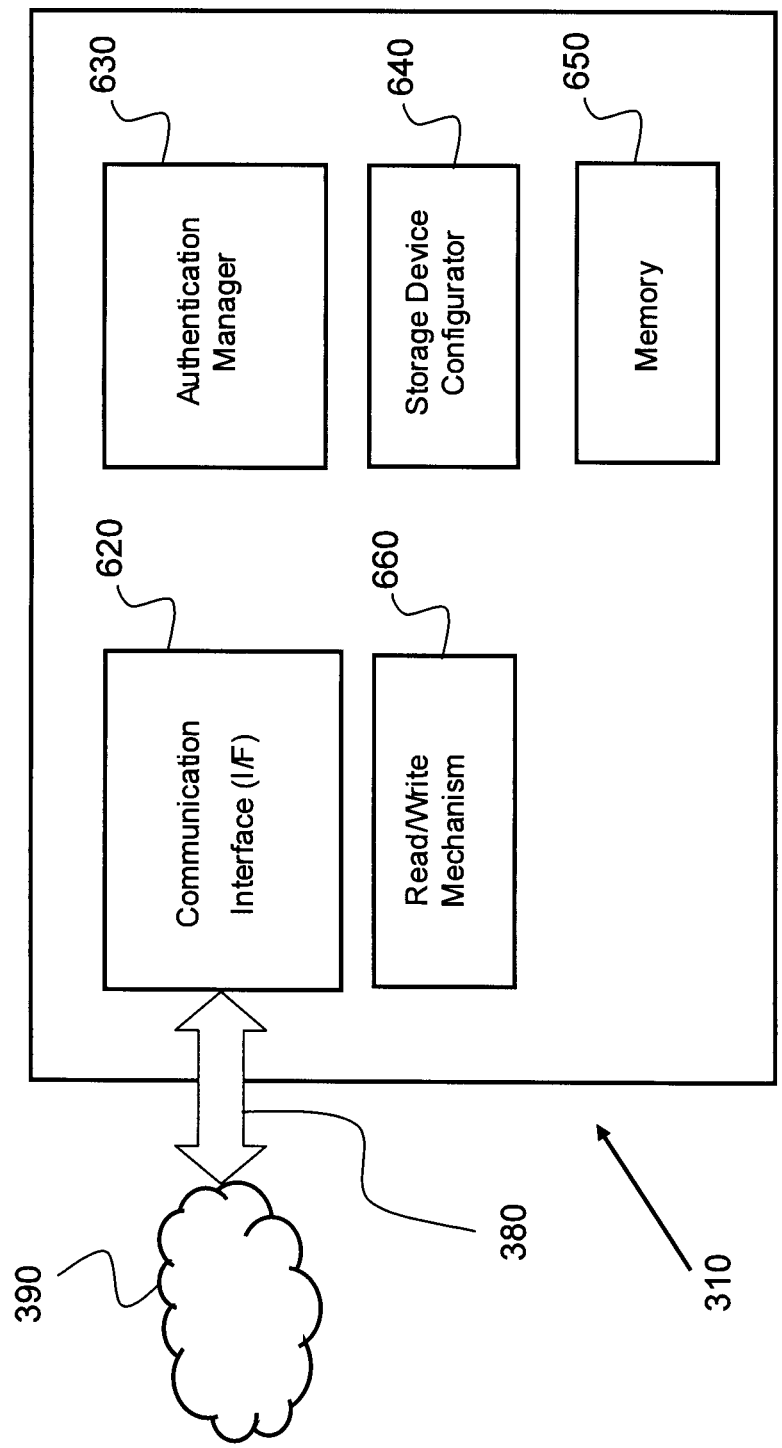
FIG. 6 is a block diagram of a third party according to an example embodiment of the present disclosure.

FIG. 6 is a block diagram of the third party 310 of FIG. 3 according to an example embodiment of the present disclosure. FIG. 6 will be described in association with FIG. 3. Third party 310 includes a communication interface 620, an authentication manager 630, a storage device configurator 640, a memory 650, and a read/write mechanism 660.

If a user wants to copy the entire multimedia content (which is part of the digital data stored in) from source SSD 350 to destination SSD 360, the user activates, invokes, or interacts with, user application 370, to cause user application 370 to send a message to third party 310 that data copy service is required, and that source SSD 350 and destination SSD 360 are in place and ready for the data transfer. Invoking client application 370 also causes third party 310 to commence a communication session with the SSDs in question, and specifies to third party 310 the service requested by the user. The service requested by the user may be transfer of the digital data from source SSD 350 to third party 310 and holding it there temporarily (e.g., several days), or (assuming the digital data is already held by third party 310) transfer of the digital data from third party 310 to destination SSD 360, or transfer of the digital data from source SSD 350 to third party 310 and concurrent transfer of the digital data from third party 310 to destination SSD 360.

In order for a third party to copy data from a source SSD to a destination SSD, the third party initiates a data copy session that includes the following stages: (1) Authentication stage (2) Establishment of virtual secure channel between the source SSD and the destination SSD via the third party (3) Reading, by the third party, data from the source SSD (4) (re)Configuration, by the third party, of the destination SSD and (5) Writing, by the third party, the data read from the source SSD to the destination SSD. As explained above a sixth stage has to be executed, which is disabling, by the third party, the source SSD.

(1) Authentication

Successful transfer of the multimedia content of source SSD 350 to destination SSD 360 necessitates also transfer of data from the restricted storage area of source SSD 350 to the restricted storage area of destination SSD 360, and also transfer of data from the security management storage area of source SSD 350 to the security management storage area of destination SSD 360. Before third party 310 transfers any data to destination SSD 360, third party 310 has to request (i.e., to read) it first from source SSD 350. Before source SSD 350 complies with the request (i.e., before source SSD 350 starts transferring the requested data to third party 310, via communication interface 620), a first authentication session has to be commenced during which third party 310 and source SSD 350 authenticate each other.

The first authentication session involves checking by source SSD 350 the authenticity of third party 310 to ensure that third party 310 is eligible to receive protected data that are stored in the restricted storage area and in the security management storage area of source SSD 350, and checking by authentication manager 630 the authenticity of source SSD 350 to ensure that source SSD 350 is eligible to transfer its digital data to another SSD. Authentication manager 630 logs-on into the system of source SSD 350 before it commences the first authentication session.

Authentication manager 630 commences a second, separate, authentication session, during which third party 310 and destination SSD 350 authenticate each other. The second, separate, authentication session involves checking by destination SSD 360 the authenticity of third party 310 to ensure that third party 310 is eligible to write data into its restricted storage area and into its security management storage area, and checking by authentication manager 630 the authenticity of destination SSD 360 to ensure that destination SSD 360 is eligible to receive digital data from another SSD. Authentication manager 630 logs-on, via communication interface 620, into the system of destination SSD 360 before it commences the second authentication session. The first authentication session and the second authentication session may be performed by exchanging authentication certificates between the involved parties, and by using the PKI paradigm, as described in more detail below in connection with FIG. 7.

Authentication manager 630 may log-on, via communication interface 620, into the system of source SSD 350 and destination SSD 360 by using the SSDs' Access Control Record ("ACR"). Briefly, "ACR" is an access control paradigm that can be viewed as a "super authority record" because an ACR contains information for indexing and it can be linked both to bibliographic records, relational databases, and to other related access control records. The ACR concept shifts from the traditional concept of "authority control" to "access control".

(2) Establishment of a Virtual Secure Channel

After source SSD 350 and third party 310 authenticate each other (during the first authentication session), authentication manager 630 and the secure storage controller (not shown in FIG. 3) of source SSD 350 establish, there between, a first secure channel, for example, by using a first session key that is available to both of them, and after destination SSD 360 and third party 310 authenticate each other third party 310 and destination SSD 360 establish a second secure channel, for example, by using a second session key that is available to both of them. As explained above, the second secure channel and the first secure channel may be established concurrently. It is noted, though, that the second secure channel may be established at any time after the first secure channel was established, or before the first secure channel is established. The first session key and the second session key may be randomly generated by the involved parties per communication session, or they may be fixed and stored in third party 310 and in the respective SSD during manufacturing thereof.

With respect to the first alternative (i.e., random generation of the first and second session keys), authentication manager 630 initiates the establishment of the first secure channel and, responsive to that initiative, authentication manager 630 and source SSD 350 jointly generate the first session key, as described in more detail in connection with FIG. 7, which is described below. The first session key is used by source SSD 350 to encrypt the digital data (in order to secure it) that has been requested by authentication manager 630 before source SSD 350 communicates the digital data to authentication manager 630. Upon receiving, via communication interface 620, the encrypted data from source SSD 350, authentication manager 630 uses the first session key to decrypt the encrypted digital data. Authentication manager 630 may use the first session key to decrypt the encrypted digital data upon completion of transferring thereof from source SSD 350 to authentication manager 630, or at any other time, such as right before authentication manager 630 is instructed or decides (depending on user application 370) to write the digital data into destination SSD 360. It is noted that the digital data of source SSD 350 may be pre-encrypted by source SSD 350 before encryption thereof with the first session key, to further increase the security level of the communicated digital data. For example the digital data may be pre-encrypted by source SSD 350 by using a content key that is available to destination SSD 360.

Likewise, authentication manager 630 may, at any time after it receives from source SSD 350 the digital data encrypted with the first session key, initiate the establishment of the second secure channel and, responsive to that initiative, authentication manager 630 and destination SSD 360 jointly generate the second session key. Authentication manager 630 uses the second session key to encrypt the digital data (to secure it) that is to be copied to destination SSD 360 before authentication manager 630 communicates the digital data to destination SSD 360. Upon receiving the encrypted data from authentication manager 630, destination SSD 360 uses the second session key to decrypt the encrypted digital data. It is noted that either of the first session key and the second session key may be generated first. That is, it is insignificant which session key (i.e., the first session key or the second session key) is generated first.

An encrypted data may be stored in the user storage area of source SSD 350 but the decryption key that is required to decrypt it may be stored in the restricted storage area or in the security management storage of source SSD 350. Therefore, it is imperative that encrypted data are transferred from the source SSD to the destination SSD along with the associated encryption/decryption keys, and other secure-related data/information, that are typically stored in one of the restricted storage areas (i.e., in the restricted storage area or in the security management storage area) of the source SSD. The way the random session keys are generated is described below in connection with FIG. 7.

In an alternative way the virtual secure channel may be established, via third party 310, by source SSD 350 and by destination SSD 360 by using a predetermined content key that is available to source SSD 350 to encrypt the digital data, and to the destination SSD 360 to decrypt the encrypted digital data. Third party 310 is communication-wise transparent, in the sense that third party 310 serves as, or provides, a communication junction to source SSD 350 and to destination SSD 360 but it is not proactively involved in encryption or decryption of data.

(3) Reading the Digital Data from a Source SSD

After the first session key is generated, authentication manager 630 uses read/write mechanism 660 to read whatever data there are to copy to destination SSD 360 from the user storage area, restricted storage area, and from the security management storage area of source SSD 350. Third party 310 includes a memory 650 for holding a list of authentication certificates of SSDs that can benefit from the data copy service rendered by third party 310, and also for temporarily holding the digital data that third party 310 reads from source SSD 350. Data that is held temporarily in memory 650 will be deleted when it is no longer required, so that no traceable data will remain in third party 310 for users to misuse or for hackers to tap or intercept.

(4) Configuration of a Destination SSD

It is essential that destination SSD 360 has the same configuration as source SSD 350 because it is function-wise imperative that, in addition to the copied multimedia content and related protected data, the data structure of source SSD 350 is also transferred to destination SSD 360, or else data will be stored in a wrong way or in a wrong storage area, for example, in the user storage area instead of in the restricted storage area, or in the restricted storage area instead of in the user storage area, and so on, which will render the copied multimedia content unusable. "Data structure" is a way of storing data in a computer so that it can be used efficiently. In particular, "data structure" refers to the arrangement of digital data inside an SSD, the type and meaning of each data item, the absolute and relative location of each data item in the SSD's memory, and so on. Data structure is defined as part of the SSD's configuration. Therefore, in order for destination SSD 360 to hold an exact copy of the digital data as stored in source SSD 350, third party 310 has to ensure that the configuration of destination SSD 360 matches that of source SSD 350 before third party 310 writes the source SSD's digital data into destination SSD 360, for example, by using read/write mechanism 660. In order to achieve that, authentication manager 630 inquires for, or requests from, source SSD 350 information about, or data representative of, its configuration, and source SSD 350 can comply with the inquiry or request by notifying third party 310 of its configuration. Source SSD 350 may notify third party 310 of its configuration, for example, by sending to third party 310 a configuration table. After being notified by source SSD 350 of its configuration, authentication manager 630 causes storage device configurator 640 to use the configuration information obtained from source SSD 350 to configure destination SSD 360 in the same way as source SSD 350. It may, therefore, be said that storage device configurator 640 imposes, or enforces, the configuration of source SSD 350 on destination SSD 360.

(5) Writing the Source SSD's Digital Data into the Destination SSD by the Third Party After storage device configurator 640 enforces the configuration of source SSD 350 on destination SSD 360 authentication manager 630 uses read/write mechanism 660 to write the digital data it received from source SSD 350 into destination SSD 360.

(6) Disabling a Source SSD

As explained above in connection with FIG. 2, the third party disables the source SSD in order to adhere to the concept that there must be only one legitimate copy. Therefore, after authentication manager 630 reads (by using read/write mechanism 660) the digital data from source SSD 350 third party 310 disables source SSD 350 sometime later, in order not to allow any device, including source SSD 350, to use the original digital data in source SSD 350. Disabling a source SSD may be executed by causing, by the third party, the source SSD to manipulate data stored therein, as described in more detail above, in connection with FIG. 2.

Figure 7:
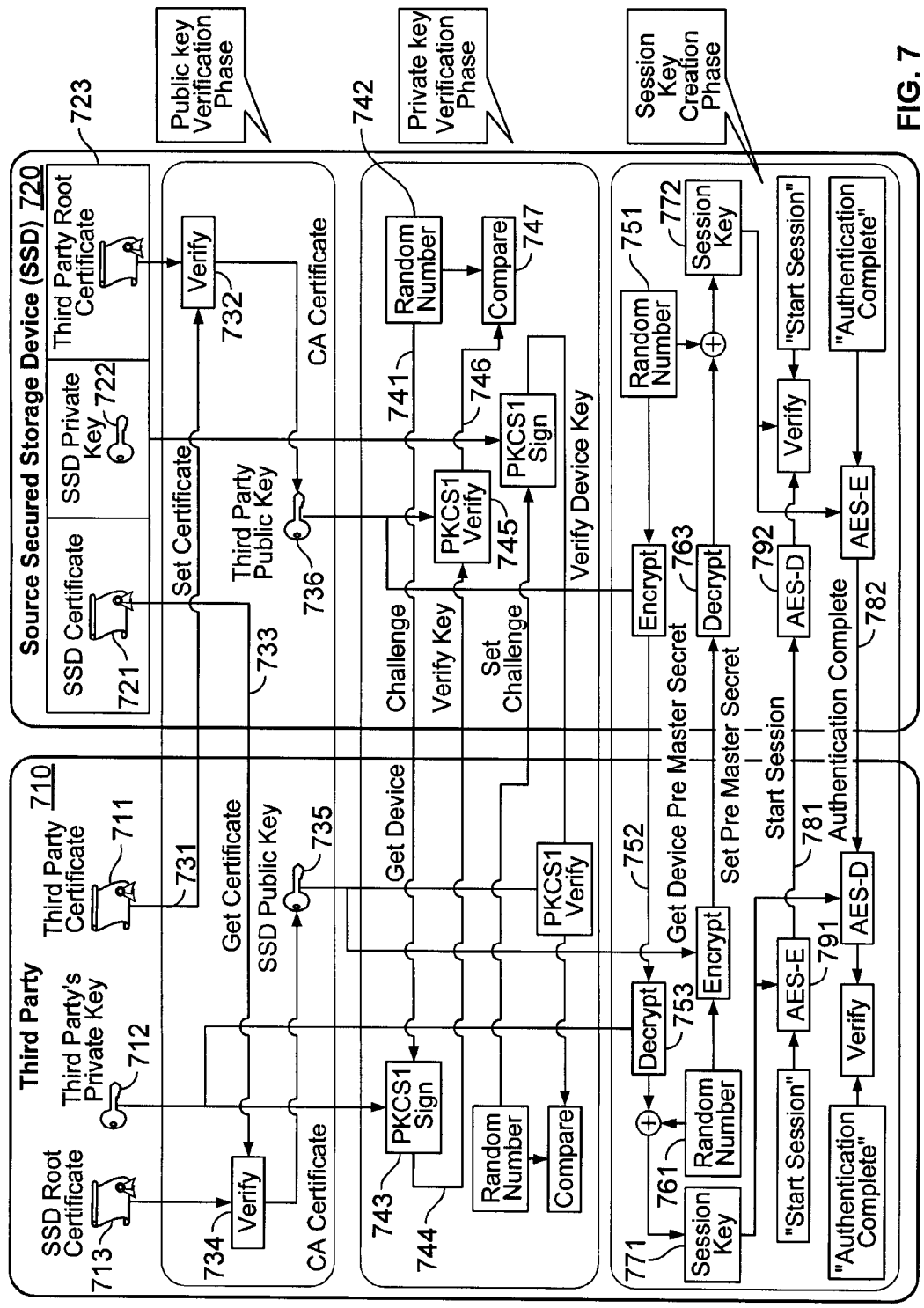
FIG. 7 is a diagram illustrating an authentication process and a session key generation method according to an example embodiment of the present disclosure.

FIG. 7 shows an authentication method for authenticating a third party 710 to a source SSD 720, and vice versa, and a session key generation method according to an example embodiment of the present disclosure. The authentication process involves using authentication certificates and the Private Key Infrastructure (PKI) methodology, as described below.

Third party 710, which may be similar or identical to third party 310 of FIGS. 3 and 6, has stored therein a third party certificate 711, a third party private key 712, and a root certificate 713 of, or associated with, source SSD 720. Third party certificate 711 includes a public key of third party 710. Likewise, source SSD 420, which may be similar or identical to SSD 100 of FIG. 1, has stored in its security management storage area an SSD certificate 721, an SSD private key 722, and a third party root certificate 723. SSD certificate 721 includes a public key of source SSD 720. The authentication process may include the following phases: (1) Public Key Verification (2) Private Key Verification and (3) Session Key Agreement, which are discussed below.

Public Key Verification

Responsive to a user instruction to commence a data copy process (for example by using a user application such as user application 370), third party 710 issues and sends a "Set-Certificate" command 731 to source SSD 720 to start a mutual authentication session.

Being the initiator third party 710 sends with Set-Certificate command 731 its authentication certificate ("i.e., "Third party Certificate" 711). In response to the Set-Certificate command 731 source SSD 720 utilizes "Third Party Root Certificate" 723 to verify (shown at 732) the authenticity of Third Party Certificate 711. If verification fails, source SSD 720 aborts the authentication process. If the authentication certificate of third party 710 ("i.e., "Third party Certificate" 711) is verified by source SSD 720 (shown at 732), source SSD 720 responds to command 733 (i.e., "Get-Certificate") that third party 710 issues by sending to third party 710 its own authentication certificate (i.e., "Source SSD Certificate" 721).

Third party 710 receives the source SSD's authentication certificate (i.e., "Source SSD Certificate" 721) and verifies (shown at 734) the authenticity of "Device Certificate" 721 by using Source Device Root Certificate 713. If this verification is also successful both parties (third party 720 and source SSD 720) get each other's public key from the corresponding authentication certificate: third party 710 has the public key 735 of source SSD 720 by virtue of verified Source SSD Certificate 721, and source SSD 720 has the public key 736 of third party 710 by virtue of verified Third party Certificate 711. After completion of this phase the two parties move on to the next phase, which is the "Private Key Verification" phase. Third Party Root Certificate 723 is typically stored in the hidden storage restricted (hidden) storage area of the SSD.

Private Key Verification

A private key of an SSD or of the third party may be verified by using various cryptographic schemes, one of which is described hereinafter. Private Key Verification is accomplished by using a double-sided challenge-response mechanism where source SSD 720 challenges third party 710 by using command 741 ("Get_Challenge"), which source SSD 720 provides to third party 710 with a relatively long (e.g., 32-byte) challenging random number (shown at 742) that is generated by source SSD 720. Third party 710 responds to command 741 ("Get_Challenge") by signing (shown at 743) the challenging random number by using Third Party Private Key 712, according to the RSA cryptographic scheme that is defined in PKCS#1 version 2.1, or according to any other suitable version that exists today or that may be devised in the future. Briefly, "RSA" (the initials of the surnames Rivest, Shamir and Adleman) is a cryptography algorithm used to sign and encrypt digital data. RSA involves using a public key that can be known to everyone and is used for encrypting messages, and a private key. Messages encrypted with the public key can only be decrypted by using a matching (i.e., an associated) private key.

The signed response (shown at 744) is verified (shown at 745) by source SSD 720 by using Third Party Public Key 736, according to the RSA cryptographic scheme that is defined in PKCS#1 version 2.1, which results in the extraction of a number that is expected to be the random number 742. If the extracted number matches random number 742, this indicates to source SSD 720 that third party 710 is who it says it is and that third party 710 is eligible to receive digital data from source SSD 720. If the number extracted at 745 differs from random number 742, the authentication fails and source SSD 720 aborts the authentication process.

Third party 710 utilizes a similar challenge-response mechanism to challenge source SSD 720. That is, third party 710 generates and sends a random number to source SSD 720 and checks whether the number retuned by source SSD 720 matches the generated random number. If the two numbers match, this indicates to third party 710 that source SSD 720 is who it says it is and that source SSD 720 is eligible to transfer its digital data to a destination SSD. If the numbers do not match, the authentication fails and third party 710 aborts the authentication process. After completion of this phase the two parties may move on to the next phase, which is the "Session Key Agreement" phase. The root certificate of the third party and the SSD's private key are usually stored in the restricted (hidden) storage area of the SSD.

Session Key Agreement

As explained above a secure channel between a third party and a source SSD (referred to herein as the "first secure channel") may be established by using a session key (referred to herein as the "first session key") that may be available to third party 710 and source SSD 720 in several ways. That is, the session key can be generated by them (as demonstrated by FIG. 7) or provided to them from an external system.

The session key is used by third party 710 and source SSD 720 as part of the two-way (i.e., source SSD/third party) authentication, to complete their mutual authentication process, and also as a cipher key to cipher data exchanged between third party 710 and source SSD 720. The session key is jointly randomized by third party 710 and by source SSD 720 and is known to both of them because it consists of two random numbers (shown at 751 and 761), where one random number (i.e., random number 761) is generated by the third party 710 and sent after encryption to source SSD 720, and the other random number (i.e., random number 751) is generated by source SSD 720 and sent after encryption to third party 720, as described below.

Source SSD 720 generates random number 751 and sends it, after encryption (shown at 752) to third party 710, where it is decrypted (shown at 753). Third party 710 generates random number 761 and sends it, after encryption (shown at 762) to source SSD 720, where it is decrypted (shown at 763). The random number generated by each side may be 16-byte long and it may be encrypted according to the RSA cryptographic scheme as defined in PKCS#1 version 2.1. "XOR-ing" (performing "exclusive or" logical operation on) the two random numbers 751 and 761 at each party results in third party 710 and source SSD 720 having the same session key (respectively shown at 771 and 772). The session key would be the 16-byte of the binary value resulting from the XOR operation of the two random numbers.

After the session key is generated, source SSD 720 needs a proof that third party 710 has generated, and will be using, the same session key. As proof, third party 710 forwards (shown at 781) a "Start-Session" command that is AES ("Advanced Encryption Standard") encrypted (shown at 791) with session key 771. Source SSD 720 decrypts the "Start Session" command with session key 772 and verifies that the "Start Session" command includes a message "Start Session". If session keys 771 and 772 do not match, the authentication process fails and source SSD 720 aborts the login process. Otherwise, source SSD 720 utilizes session key 772 to encrypt and to send (shown at 782) "Authentication Complete" message 782 to third party 710. Third party 710 decrypts "Authentication Complete" message 782 with session key 771 and verifies that "Authentication Complete" message 782 contains the message "Authentication Complete". This last step completes the session key agreement process and opens a secure channel over which commands and data (e.g., the digital data) can be exchanged between third party 710 and source SSD 720 in a secure manner (i.e., encrypted). The session key will be used by third party 710 and source SSD 720 during the entire communication session, which is the period until third party 710 reads out the entire digital data that is stored in source SSD 720. The authentication and session keys generation process exemplified in FIG. 7 can likewise be used, mutatis mutandis, for authenticating third party 710 to a destination SSD and vice versa. That is, in the latter case the word "source" should be replace with the word "destination".

After the first and the second session keys are generated, the first secure channel is established by encrypting, by the source SSD, the digital data with the first session key that is available to the third party, and the second secure channel is established by decrypting, by the third party, the encrypted digital data with the first session key and encrypting the decrypted digital data with the second session key that is available to the destination SSD. The first session key and the second session key may be stored in the third party and in the respective SSD during manufacturing of the SSDs, or later. Encrypting the digital data by the source SSD with the first session key may include a prior step of encrypting, by the source SSD, the digital data with a content key that is available to the destination SSD but not to the third party. A content key may be stored in the source SSD and in the destination SSD during manufacturing thereof, or they may be generated by one party (e.g., the source SSD) and transferred to the other party (e.g., the destination SSD), the latter alternative being describe below, in connection with FIG. 8.

Third party 710 participates in the generation process of the encryption keys required to establish the virtual secure channel that includes a first secure channel with source SSD 720 and a second secure channel with a destination SSD (not shown in FIG. 7). However, as explained above, a third party may copy digital data from a source SSD to a destination SSD without the third party generating an encryption/decryption key, and without the third party knowing which encryption/decryption key(s) is/are used by the source SSD and destination SSD, as shown in FIG. 8, described below.

Figure 8:
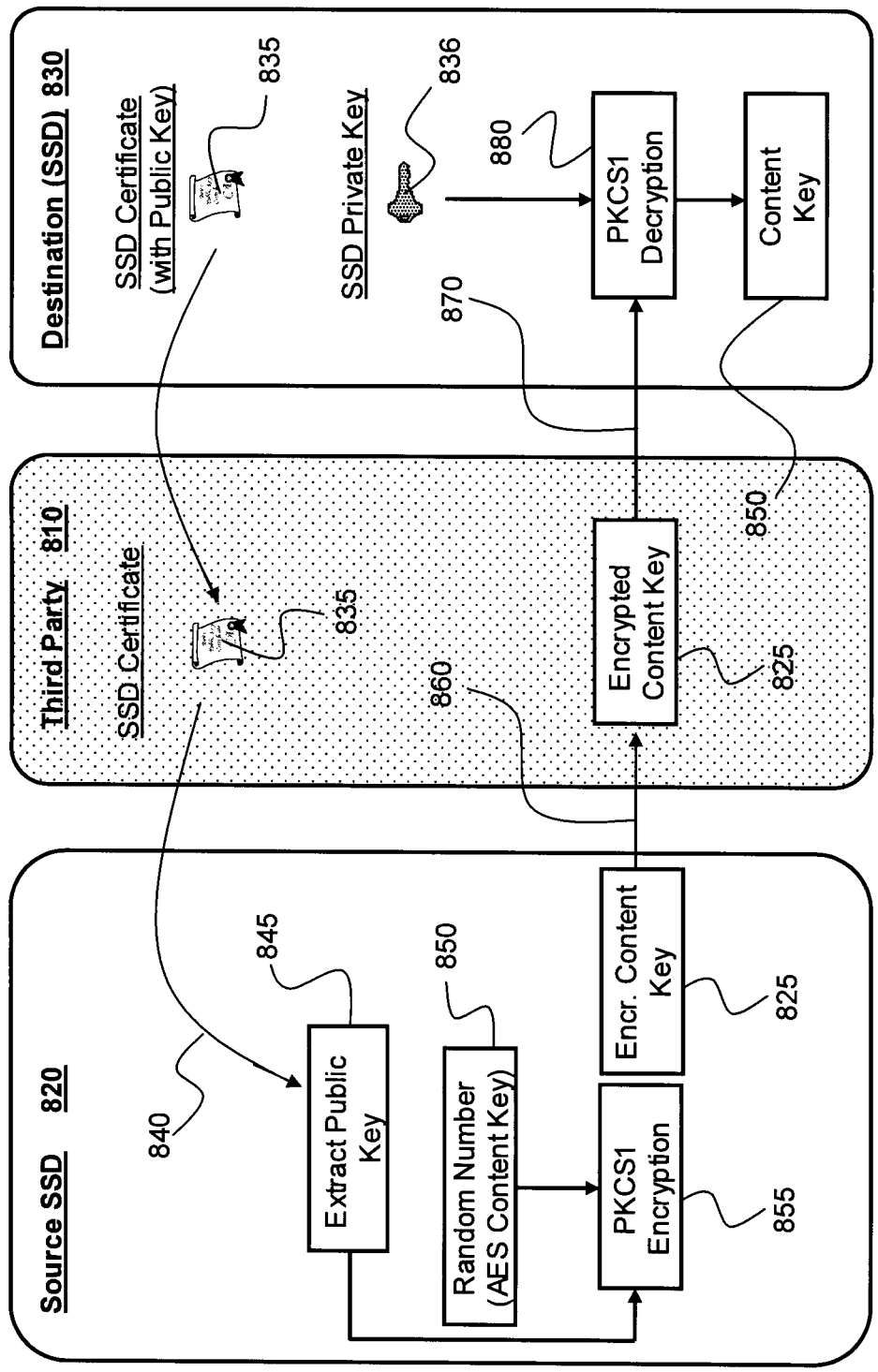
FIG. 8 is a diagram illustrating a content key generation according to an example embodiment of the present disclosure.

FIG. 8 shows a method for generating a content key by source SSD 720 according to an example embodiment of the present disclosure. In order to maintain confidentiality of the digital data while it is forwarded (by and via third party 810) from source SSD 820 to destination SSD 830, source SSD 820 and destination SSD 830 take on the security responsibility with the third party taking on a mediatory role, as described below. It is assumed that third party 810, source SSD 820, and destination SSD 830 already completed the public key and private key verification phases described above in connection with FIG. 7, and, consequently, that third party 810 associates destination SSD 830 with an authentication certificate that contains a public key of destination SSD 830. In general, source SSD 820 randomly generates a content key to encrypt its digital data prior to transmission thereof. Thereafter, source SSD 820 forwards the content key to destination SSD 830 so that destination SSD 830 can use the content key to decrypt the encrypted digital data. The content key generation process is performed as described below.

After third party 810 and destination SSD 830 authenticate each other third party 810 holds the authentication certificate 835 of destination SSD 730. In general, third party 810 forwards the public key of destination SSD 830 to source SSD 820; source SSD 820 utilizes the destination SSD's public key to encrypt a content key (i.e., a key for ciphering data); and destination SSD 830 utilizes the content key to decrypt the encrypted data. To achieve that, third party 810 forwards 840 the authentication certificate 835 of destination SSD 830 to source SSD 820, and source SSD 820 verifies that SSD certificate 835 of destination SSD 830 is signed by the destination's SSD's root authentication certificate held by the third party. Once the signature on the destination's SSD's root certificate is verified by source SSD 820, source SSD 820 extracts 845 the public key of destination SSD 830 from the destination SSD's authentication certificate. Source SSD 820 generates a random number 850 that serves as the content key. Then, source SSD 820 encrypts 855 the random number (i.e., the content key) with the extracted public key of destination SSD 830, signs the encrypted content key with the source SSD's private key, concatenates the source SSD's authentication certificate to the signed encrypted content key, and forwards 860 the signed encrypted content key 825 to third party 810. Third party 810 forwards at 870 encrypted content key 825, as is, to destination SSD 830. Destination SSD 830 then ensures that the source SSD's authentication certificate has been signed by the source SSD's root authentication certificate held by third party 810, and uses its private key 836 to decrypt the encrypted content key. Destination SSD 830 also uses the source SSD's public key, which is held in the source SSD's certificate, to ensure that the content key has not been changed.

From this stage on source SSD 820 can securely send digital data to destination SSD 830 via third party 810. Absent knowledge of the destination SSD's private key, third party 810 cannot decrypt any data that source SSD 820 forwards through it to destination SSD 830, which is desired security-wise. Third party 810, therefore, transfers, or relays, the authentication certificate/public key of destination SSD 830 from destination SSD 830 to source SSD 820, and the encrypted content key from source SSD 820 to destination SSD 830. Alternatively, a content key may be made available to a source SSD during its manufacturing and to a destination SSD by transferring the content key to the destination SSD from or via the third party. Alternatively, a content key may be made available to the source SSD by transferring it from the destination SSD via the third party.

Figure 9:
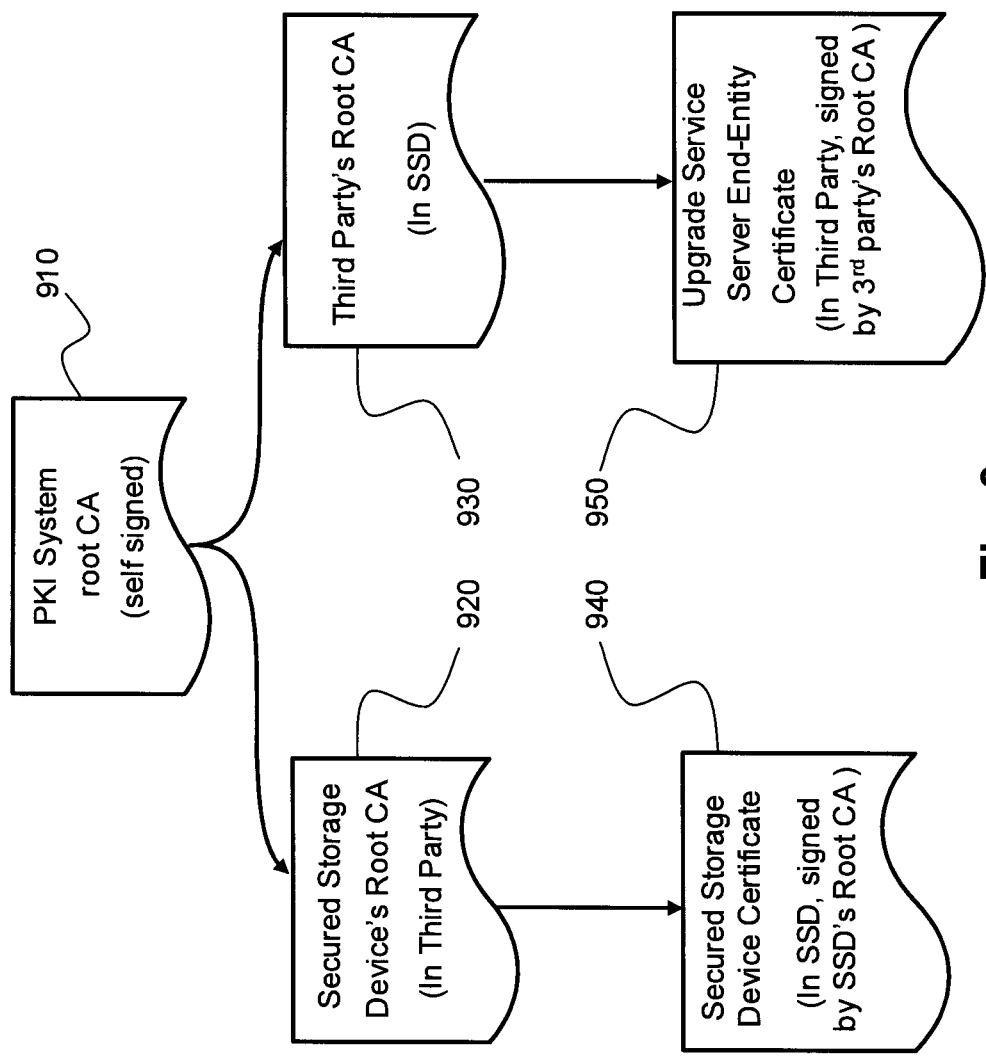
FIG. 9 shows typical authentication certificates' hierarchy.

FIG. 9 shows an exemplary authentication certificates' hierarchy. PKI system Root CA ("CA" stands for "Certifying Authority") 910 is trusted by secured storage devices and by service providers. Secured Storage Device's Root CA 920, which is the SSD's unique root CA, is contained in, or held by, a third party to allow the third party to authenticate an SSD. The third party may hold a list of SSD's root CAs for SSDs that are entitled to the data copy service rendered by the third party. Likewise, Third Part's Root CA 930, which is the third party's root CA, is contained in or held by an SSD. Each of Secured Storage CA Device's Root CA 920 and Third Part's Root CA 930 is signed by PKI system Root CA 910. Therefore, it may be said that a commonly trusted authority (i.e., PKI System Root CA 910) delegates trust to Secured Storage CA Device's Root CA 920 and to Third Part's Root CA 930. Secured Storage Device Certificate 940, which is the SSD's certificate, is contained in or held by the SSD and signed by Secured Storage Device's Root CA 920. Likewise, Third Party Certificate 950, which is the third party's certificate, is contained in or held by the SSD and signed by Third Party's Root CA 930.

As said above, the third party trusts Secured Storage CA Device's Root CA 920, and the SSD trusts Third Party's Root CA 930. Therefore, mutual trust between the third party and the secured storage device can be facilitated by placing, storing, or holding Secured Storage CA Device's Root CA 920 in the third party, and by placing, storing, or holding Third Party's Root CA 903 in the SSD. More specifically, the third party will trust the SSD only if the third party receives from the SSD an authentication certificate that has been signed by the Secured Storage Device's Root CA 920. Likewise, the SSD will trust the third party only if the SSD receives from the third party an authentication certificate that has been signed by the Third Party's Root CA 903. With respect to the third party and source SSD, successful authentication also means that the third party is eligible, authorized, or entitled to receive, or read, digital data from the source SSD, and that the source SSD is eligible, authorized, or entitled to the data copy service rendered by the third party. With respect to the third party and destination SSD, successful authentication also means that the third party is eligible, authorized, or entitled to write digital data into the destination SSD, and that the destination SSD is eligible, authorized, or entitled to the data copy service rendered by the third party.

Figure 10:
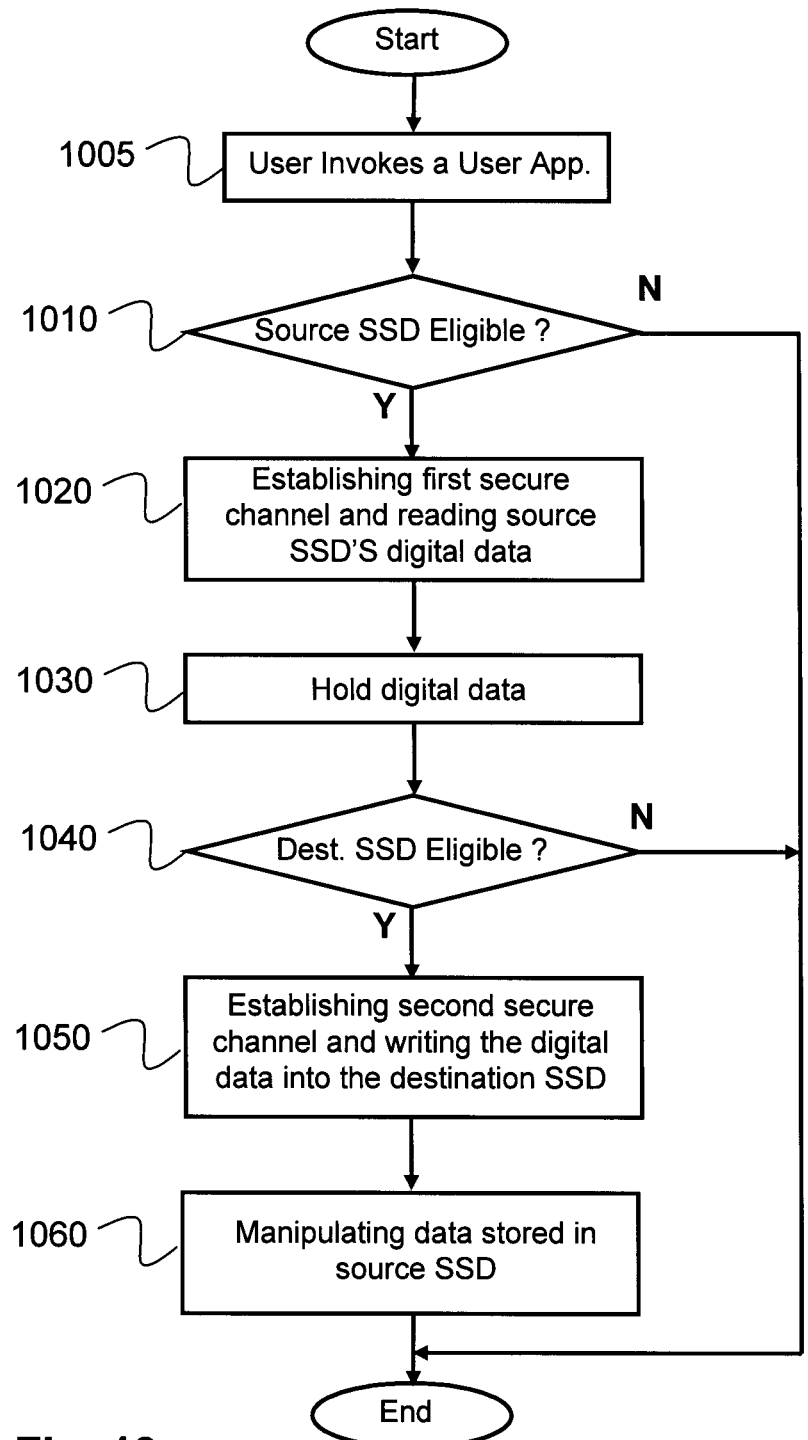
FIG. 10 is a method for copying protected data from a source SSD to a destination SSD by and via a third party according to an example embodiment of the present disclosure.

FIG. 10 shows a method for copying digital data from a source SSD to a destination SSD by and via a third party according to an example embodiment of the present disclosure. A user inserts a source SSD into a host device and invokes, at step 1005, a user application (e.g., user application 370 of FIG. 3) on a host device to prompt a third party to execute a data copy process. At step 1010 the third party determines whether the source SSD is eligible to transfer digital data to a destination SSD, which includes protected data that are stored in the source SSD and are not transferable to ineligible devices. If the source SSD is not eligible to transfer the digital data to the destination SSD (shown as "N" at 1010), the authentication, and therefore, the entire data copy process, is aborted. If the source SSD is eligible to transfer the digital data to the destination SSD (shown as "Y" at 1010), the third party establishes, at step 1020, a first secure channel with the source SSD and receives (by causing the source SSD to transmit) the digital data from the source SSD over the first secure channel. At step 1030 the third party holds the digital data until it is time to transfer it to the destination SSD, or after a predetermined period of time (e.g., 2 days) elapses, after which the third party will delete its copy of the digital data. Nevertheless, the third party may ask the source SSD in question to resend to it the digital data, whether conditionally or not. At step 1040 the third party determines whether the destination SSD is eligible to receive the digital data from the source secured storage device. If the destination SSD is eligible to receive the digital data (shown as "N" at 1040), the third party establishes, at step 1050, a second secure channel with the destination SSD and transfers the digital data to the destination SSD over the second secure channel. At step 1060 the third party causes the source SSD to manipulate data stored in the source SSD in order to prevent future use of the protected data.

The third party may cause the source SSD to manipulate data stored therein by causing the source SSD to disable security features which are associated with the protected data, such that the protected data will become inaccessible to any device. The third party may cause the source SSD to manipulate data stored therein by causing the source SSD (i.e., by sending a command to the source SSD's controller) to erase authentication parameters associated with the protected data, such that no device can use the protected data. Alternatively, the third party may send a command to the source SSD's controller (which may be identical or similar to secure storage controller 140 of SSD 100) to block access to all the data that should not be usable by any electronic device. Alternatively, the third party may encrypt the data of the source SSD using an encryption key known only to the third party so that the data of the source SSD will not be usable by any electronic device until when the electronic device requests from the third party the encryption key to decrypt the encrypted data, and the third party complies with the request.

The third party may cause the data stored in the source SSD to be manipulated upon, or after, the third party completes transferring of the digital data from the source SSD to the third party, or upon, or after, the third party completes copying of the digital data to the destination secured storage device. The first secure channel and the second secure channel constitute a virtual secure channel between the source SSD and the destination SSD, as described above. Upon completion of transferring of the digital data to the destination SSD the user application may introduce to the user a corresponding message (e.g., "data copy completed"). It is noted that any source SSD and any destination SSD mentioned herein may be a flash memory device. The flash memory device may be selected from the group including (the list not being exhaustive) Trusted Flash device, Secure Digital ("SD"), miniSD, microSD, Hard Drive ("HD"), Memory Stick ("MS"), USB device, Disk-on-Key ("DoK"), iNAND, and the like. It is noted that the source SSD and/or the destination SSD may be a non-flash device.

A source SSD (e.g., source SSD 205 of FIG. 2) is also provided, which facilitates reading protected data therefrom in order to copy the protected data to a destination SSD (e.g., destination SSD 260 of FIG. 2) via a third party (e.g., third party 210 of FIG. 2). The source SSD may include a mass storage area, similar or identical to mass storage 108 of FIG. 1, for storing digital data that includes protected data that are not transferable to ineligible devices. The source SSD may also include a secure storage controller similar to secure storage controller 140 of FIG. 1, which is adapted (i) to determine whether a third party (e.g., third party 210 of FIG. 2) is eligible to receive therefrom the digital data and to transfer the digital data to a destination SSD (e.g., destination SSD and, if so, (ii) to establish a secure channel between the source SSD and the third party and (iii) to transfer the digital data to the third party over the secure channel.

The secure storage controller may be further adapted to prove to the third party its eligibility to send the digital data to the third party. The secure storage controller may be further adapted to generate a content key (e.g., content key 850 of FIG. 8), use the content key to encrypt the digital data, and transfer the encrypted digital data and the content key to the third party over the secure channel, the encrypted digital data and the content key to be further transferred from the third party to the destination secured storage device.

The secure storage controller may establish the secure channel by using a session key that is available to the secure storage controller to encrypt the encrypted digital data and to the third party to decrypt the encrypted digital data, and the secure storage controller may generate the session key randomly by using data originating from the destination SSD. Responsive to the secure storage controller receiving a command from the third party to prevent future use of the protected data the secure storage controller may manipulate data stored in the mass storage area such that the protected data can no longer be used.

A destination SSD (e.g., destination SSD 260 of FIG. 2) is also provided to facilitate copy of protected data thereto from a source SSD (e.g., source SSD 250 of FIG. 2) via a third party (e.g., third party 210 of FIG. 2), the destination SSD including a mass storage area for storing therein digital data that originates from a source SSD, the digital data including protected data that are not transferable to ineligible devices; and a secure storage controller. The secure storage controller may be adapted (i) to prove to a third party its eligibility to receive the digital data from the third party and, upon proving the eligibility of the secure storage controller, (ii) to establish a secure channel between the destination SSD and the third party and (iii) to receive the digital data from the third party over the secure channel. The secure storage controller may be further adapted to determine whether the third party is eligible to write the digital data into the destination SSD's mass storage area.

If the digital data received by the destination SSD is encrypted by the source SSD by using a content key, the secure storage controller may be further adapted to receive the content key from the source secured storage device via the third party and to use the received content key to decrypt the encrypted digital data.

The secure storage controller may establish the secure channel by using a session key that is available to the third party to encrypt the digital data and to the secure storage controller to decrypt the encrypted digital data. The secure storage controller may generate the session key randomly by using data originating from the source SSD. The source SSD and the destination SSD may be the same SSD.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Having thus described exemplary embodiments of the invention, it will be apparent to those skilled in the art that modifications of the disclosed embodiments will be within the scope of the invention. Alternative embodiments may, accordingly, include more modules, less modules, and/or functionally equivalent modules. The present disclosure is relevant, mutatis mutandis, to various types of secured mass storage devices such as SD-driven flash memory cards, flash storage device, non-flash storage devices, and so on.

What is claimed is:

1. A third party system for safeguarding and securely delivering digital data from a source storage to a destination storage, the third party system comprising:
    a memory;
    a communication interface configured to communicate with a host device system that at a given time hosts one or both of the source storage and the destination storage, wherein the digital data comprises protected data that are not available to unauthorized devices; and
    a processor configured to enable the third party system to:
        transmit information to the source storage in order for the source storage to authorize the third party system to transfer the protected data from the source storage to the destination storage via the third party system;
        receive information from the source storage and using this information, as well as one or more transfer rules, to determine whether to allow the source storage to transfer the protected data to the destination storage;
        transmit information to the destination storage in order for the destination storage to authorize the third party system to transfer the protected data to the destination storage via the third party system;
        receive information from the destination storage in order to determine whether to enable the destination storage to receive the protected data from the source storage;
        in response to determining that the source storage and the destination storage are both allowed to send and receive, respectively:
            communicate with the source storage to create a session key;
            establish a virtual secure channel between the source storage and the third party system using the session key;
            establish a virtual secure channel between the third party system and the destination storage;
            receive a key of the destination storage;
            relay, to the source storage, the key of the destination storage;
            receive, from the source storage, a content key encrypted with the key of the destination storage;
            relay, to the destination storage, the content key encrypted with the key in order for it to be decrypted by the destination storage;
            relay the protected data in encrypted form from the source storage to the destination storage for decryption by the destination storage using the content key, where the third party system is unable to decrypt the encrypted protected data; and
            prompt the source storage to make the protected data on the source storage inaccessible to any electronic device, wherein until the transfer the protected data was accessible only from the source storage.

2. The third party system according to claim 1, wherein the third party system is configured to establish the virtual secure channel by establishing a first secure channel with the source storage and a second secure channel with the destination storage.

3. The third party system according to claim 1, wherein the third party system is configured to instruct the source storage to make the protected data inaccessible to any electronic device after completion of transfer of the protected data to the destination storage.

4. The third party system according to claim 1, wherein the third party system is configured to instruct the source storage to make the protected data inaccessible to any electronic device after completion of transfer of the protected data to the third party system.

5. The third party system according to claim 1, wherein the third party system is configured to communicate with the source storage and the destination storage when the source storage and the destination storage are both concurrently connected to a single host device.

6. The third party system according to claim 1, wherein the third party system is configured to determine whether the source storage is allowed to send the protected data to the destination storage by:
    receiving a source storage certificate; and
    determining whether the received source storage certificate is included in a list of certificates, the list indicative of storage devices entitled to a data copy service provided by the third party system.

7. The third party system according to claim 1, wherein the third party system is further configured to receive from the host device system a user instruction, the user instruction indicative of a request to commence the process of delivering the protected content from the source storage to the destination storage; and
    wherein, in response to receiving the user instruction and in response to determining that the source storage and the destination storage are both allowed to send and receive, respectively, the third party system is configured to relay the encrypted protected data from the source storage to the destination storage.

8. The third party system according to claim 1, wherein the processor is configured to:
    authorize the third party system to the source storage to transfer the protected data from the source storage to the destination storage via the third party system by sending authentication data in order to identify the third party system to the source storage and to prove to the source storage that the third party system is allowed to transfer the protected data from the source storage to the destination storage;

authorize the third party system to the destination storage to transfer the protected data to the destination storage via the third party system by sending the authentication data in order to identify the third party system to the destination storage and to prove to the destination storage that the third party system is allowed to transfer the protected data to the destination storage;

receive information from the source storage in order for the third party system to determine whether to enable the source storage to transfer the protected data to the destination storage by receiving, from the source storage, source storage data in order to identify the source storage and to determine whether the source storage is allowed to send the protected data to the destination storage; and receive information from the destination storage in order for the third party system to determine whether to enable the destination storage to receive the protected data from the source storage by receiving, from the destination storage, destination storage data in order to identify the destination storage and to determine whether the destination storage is allowed to receive the protected data.

9. The third party system according to claim 8, wherein the virtual secure channel between the source storage and the destination storage is configured to enable transfer of the protected data without the source storage and the destination storage communicating with each other directly.

10. The third party system according to claim 8, wherein the third party system is configured to prove to the destination storage that the third party system is allowed to write the protected data into a restricted storage area of the destination storage and allowed to write data into a security management storage area of the destination storage.

11. The third party system according to claim 10, wherein the data to write into the security management storage area of the destination storage comprises authentication keys that are entitled to access the restricted storage area of the destination storage.

12. The third party system according to claim 10, wherein the processor is further configured to send a request to the source storage for configuration data of the source storage; and wherein, prior to the third party system transferring the protected data to the destination storage, the processor is configured to use the configuration data of the source storage to configure the destination storage in a same way as the source storage.

13. The third party system according to claim 1, wherein the third party system comprises a computer system; and wherein the processor is configured to instruct the source storage to make the protected data on the source storage inaccessible by instructing the source storage to erase authentication parameters associated with the protected data.

14. The third party system according to claim 1, wherein the processor is further configured to:

poll the source storage of a configuration for storing the protected data; and instruct the destination storage to configure itself in the configuration for storing the protected data.

15. The third party system according to claim 1, wherein the processor is configured to receive the key of the destination storage by receiving a public key of the destination storage;

wherein the processor is configured to relay to the source storage the public key of the destination storage;

wherein the processor is configured to receive, from the source storage, the content key encrypted with the public key of the destination storage;

wherein the processor is configured to relay, to the destination storage, the content key encrypted with the public key in order for it to be decrypted by the destination storage.

16. The third party system according to claim 15, wherein the controller is configured to receive the encrypted content key by receiving a random number generated by the source storage and encrypted by the public key of the destination storage.

17. The third party system according to claim 16, wherein the controller is configured to receive the encrypted content key by receiving the encrypted content key signed by a private key of the source storage and concatenated with an authentication certificate of the source storage;

wherein the controller is configured to transmit the encrypted content key by transmitting, to the destination storage, the encrypted content key signed by a private key of the source storage and concatenated with an authentication certificate of the source storage in order for the destination storage to ensure that the authentication certificate of the source storage was signed by the source storage's root authentication certification held by the third party system.

18. A source storage for transferring protected data to a destination storage via a third party system, the source storage comprising:

a mass storage area storing digital data, the digital data including the protected data that are not transferable to ineligible devices and one or more usage rules, the protected data is only accessible from the source storage according to the one or more usage rules until transfer of the protected data; and a storage controller adapted to:

transmit information to the third party system in order for the third party system to determine using one or more transfer rules whether the source storage is allowed to transfer the protected data via the third party system;

receive information from the third party system in order for the storage controller to determine that the third party system is authorized to transfer the protected data;

communicate with the third party system in order to create a session key;

establish a secure channel between the source storage and the third party system using the session key;

receive, from the third party system, a key of the destination storage;

encrypt a content key with the key of the destination storage;

transmit the encrypted content key to the third party system in order for the third party system to transmit the encrypted content key to the destination storage;

encrypt the protected content using the content key;

send, via the third party system over the secure channel, the protected data in encrypted form to the destination storage for decryption by the destination storage using the content key, wherein the third party system is unable to decrypt the encrypted protected data using the content key;

receive an instruction from the third party system, the instruction indicative of making the protected data inaccessible to any electronic device; and in response to receiving the instruction, make the protected data inaccessible to any electronic device.

19. The source storage according to claim 18, wherein the storage controller is adapted to receive the public key of the destination storage by:

receiving, from the third party system, an authentication certificate of the destination storage; and obtaining the public key using the authentication certificate of the destination storage.

20. The source storage according to claim 18, wherein the storage controller is configured to generate the session key randomly by using data originating from the destination storage.

21. The source storage according to claim 18, wherein the storage controller is adapted to communicate with the third party system in order for the third party system to determine that the source storage is allowed to transfer the protected data via the third party system by sending a source storage certificate to the third party system, the source storage certificate for checking against a list of certificates, the list indicative of storage devices entitled to a data copy service provided by the third party system.

22. The source storage according to claim 18, wherein the storage controller is adapted to:

communicate with the third party system in order for the third party system to determine using one or more transfer rules whether the source storage is allowed to transfer the protected data via the third party system by sending source storage data to the third party system in order to identify the source storage to the third party system and for the third party system to determine that the source storage is allowed to transfer the protected data via the third party system; and communicate with the third party system in order for the storage controller to determine whether the third party system is authorized to transfer the protected data to a destination storage by receiving third party data from the third party system in order to identify the third party system and for the storage controller to determine whether the third party system is allowed to receive therefrom the protected data and to transfer the protected data to a destination storage.

23. The source storage according to claim 18, wherein the storage controller is configured to receive, from the third party system, the key of the destination storage by receiving a public key of the destination storage;

wherein the storage controller is configured to encrypt the content key with the public key of the destination storage; and wherein the storage controller is further configured to generate the content key.

24. The source storage according to claim 23, wherein the storage controller is configured to generate the content key by generating a random number that serves as the content key.

25. The source storage according to claim 24, wherein the storage controller is further configured to sign the encrypted content key with a private key of the source storage, concatenate an authentication certificate of the source storage to the signed encrypted content key, and transmit the signed encrypted content key with the concatenated source storage's authentication certificate to the third party system.

26. A method for a third party system to facilitate delivering digital data from a source storage to a destination storage, the digital data comprising protected data, the method comprising:

in the third party system:

transmitting information to the source storage in order for the source storage to authorize the third party system to transfer the protected data from the source storage to the destination storage via the third party system;

transmitting information to the destination storage in order for the destination storage to authorize the third party system to transfer the protected data to the destination storage via the third party system;

receiving, from the source storage, source storage data and using the source storage data, as well as one or more transfer rules, to determine whether to allow the source storage to send the protected data to the destination storage;

receiving, from the destination storage, destination storage data and using the destination storage data to determine whether the destination storage is allowed to receive the protected data;

in response to determining the source storage and the destination storage are both allowed to send and receive, respectively:

communicating with the source storage to create the session key;

establishing a virtual secure channel between the source storage and the third party system using the session key;

establish a virtual secure channel between the third party system and the destination storage;

receiving a key of the destination storage;

relaying, to the source storage, the key of the destination storage;

receiving, from the source storage, a content key encrypted with the key of the destination storage;

relaying, to the destination storage, the content key encrypted with the key in order for it to be decrypted by the destination storage;

relaying protected data in encrypted form from the source storage to the destination storage for decryption by the destination storage using the content key where the third party system is unable to decrypt the encrypted protected data; and instructing the source storage to make the protected data on the source storage inaccessible to any electronic device, wherein until the transfer the protected data was accessible only from the source storage.

27. The method according to claim 26, wherein instructing the source storage to make the protected data inaccessible to any electronic device is performed after completion of transfer of the protected data to the destination storage.

28. The method according to claim 26, wherein instructing the source storage to make the protected data inaccessible to any electronic device is performed after completion of transfer of the protected data to the third party system.

29. The method according to claim 26, wherein communicating with the source storage and the destination storage are performed when the source storage and the destination storage are concurrently connected to a single host device.

30. The method according to claim 26, wherein determining whether the source storage is allowed to send the protected data to the destination storage comprises:

receiving a source storage certificate; and
determining whether the received source storage certificate is included in a list of certificates, the list indicative of storage devices entitled to a data copy service provided by the third party system.

31. The method according to claim 26, further comprising receiving from the host device system a user instruction to copy; and
in response to receiving the user instruction and in response to determining that the source storage and the destination storage are both allowed to send and receive, respectively, relaying the encrypted protected data from the source storage to the destination storage.

32. The method according to claim 26, further comprising sending configuration information to the destination storage in order for the destination storage to configure itself to a same configuration as a configuration of the source storage before the protected data is sent from the third party system to the destination storage.

33. A method for transferring protected data from a source storage to a destination storage via a third party system, the method comprising:
in the source storage:
using one or more usage rules in order for the source storage to determine whether to use the protected data;
transmitting information to the third party in order for the third party system, using one or more transfer rules, to determine whether the source storage is allowed to transfer the protected data via the third party system, the protected data is only accessible from the source storage until transfer of the protected data;
receiving information from the third party system in order for the storage controller to determine that the third party system is authorized to transfer the protected data;
communicating with the third party system in order to create a session key;
establishing a secure channel between the source storage and the third party system using the session key;
receiving, from the third party system, a key of the destination storage;
encrypting a content key with the key of the destination storage;
transmitting the encrypted content key to the third party system in order for the third party system to transmit the encrypted content key to the destination storage;
encrypting the protected content using the content key;
sending, via the third party system using the secure channel, the protected data in encrypted form to the destination storage for decryption by the destination storage using the content key, wherein the third party system is unable to decrypt the encrypted protected data using the content key;
receiving an instruction from the third party system, the instruction indicative of making the protected data inaccessible to any electronic device; and
in response to receiving the instruction, making the protected data inaccessible to any electronic device.

34. The method according to claim 33, wherein receiving the public key of the destination storage comprises receiving, from the third party system, an authentication certificate of the destination storage and obtaining the content key using the authentication certificate of destination storage.

35. The method according to claim 33, wherein the session key is generated randomly by using data originating from the destination storage.

36. The third party system according to claim 1, wherein the source storage comprises a memory stick.

37. The source storage according to claim 21, wherein the storage controller is adapted to: send source storage data to the third party system in order to identify the source storage to the third party system and for the third party system to determine that the source storage is allowed to transfer the protected data via the third party system; and receive third party data from the third party system in order to identify the third party system and for the storage controller to determine whether the third party system is allowed to receive therefrom the protected data and to transfer the protected data to a destination storage;
wherein the storage controller is configured to determine whether the third party system is allowed to receive the protected data by:
comparing the third party data with a certificate issued by a trusted certificate authority, the certificate indicative of an entity entitled to copy the protected data, in order for the source storage to determine whether the third party system has permission to copy the protected data.

38. A destination storage for receiving protected data from a source storage via a third party system, the destination storage comprising:
a mass storage area; and
a storage controller adapted to
transmit information to the third party system in order for the third party system to determine using one or more transfer rules whether the destination storage is allowed to receive the protected data via the third party system;
receive information from the third party system in order for the storage controller to determine that the third party system is authorized to send therefrom the protected data and to transfer the protected data from a source storage and, if so:
communicate with the third party system in order to create a session key;
establish a secure channel between the destination storage and the third party system using the session key;
send, to the third party system, a key of the destination storage;
receive, from the third party system, an encrypted content key, the content key being generated by the source storage and encrypted with the key of the destination storage;
decrypting the encrypted content key;
receive configuration information in order for the destination storage to configure itself to a same configuration as a configuration of the source storage before the protected data is sent from the third party system to the destination storage;
receive encrypted protected data and one or more usage rules from the third party system over the secure channel, wherein the encrypted protected data is encrypted using the content key and wherein the third party system is unable to decrypt the encrypted protected data;
decrypt the protected data in encrypted form using the content key; and
use the protected data according to the one or more usage rules.

39. The destination storage according to claim 38, wherein the destination storage is configured to determine whether the third party system is allowed to write the protected data into a restricted storage area of the destination storage and allowed to write data into a security management storage area of the destination storage.

40. The destination storage according to claim 39, wherein the data to write into the security management storage area of the destination storage comprises authentication keys that are entitled to access the restricted storage area of the destination storage.

* * * * *